(12) United States Patent
Minzberg

(10) Patent No.: US 12,014,342 B2
(45) Date of Patent: Jun. 18, 2024

(54) SYSTEM AND METHOD FOR PROCESSING COMMUNAL AND PUBLIC COLLECTIONS BY UTILIZING A PUBLICLY ACCESSIBLE KIOSK

(71) Applicant: T Pushke Inc, Monsey, NY (US)

(72) Inventor: Aharon Minzberg, Monsey, NY (US)

( * ) Notice: Subject to any disclaimer, the term of this patent is extended or adjusted under 35 U.S.C. 154(b) by 0 days.

(21) Appl. No.: 17/944,774

(22) Filed: Sep. 14, 2022

(65) Prior Publication Data

US 2024/0086880 A1 Mar. 14, 2024

(51) Int. Cl.
*G06Q 20/18* (2012.01)
*G06Q 20/10* (2012.01)

(52) U.S. Cl.
CPC .......... *G06Q 20/18* (2013.01); *G06Q 20/102* (2013.01)

(58) Field of Classification Search
CPC .............................. G06Q 20/18; G06Q 20/102
USPC ......................................................... 235/379
See application file for complete search history.

(56) References Cited

U.S. PATENT DOCUMENTS

| | | | |
|---|---|---|---|
| 2013/0238455 A1* | 9/2013 | Laracey | G06Q 20/102 705/21 |
| 2014/0201084 A1* | 7/2014 | Dagenais | G06Q 20/382 705/64 |
| 2017/0364326 A1* | 12/2017 | Chang | G06Q 20/3226 |
| 2020/0005363 A1* | 1/2020 | Terry | G06Q 30/0279 |
| 2020/0342438 A1* | 10/2020 | Chew | G06Q 20/3274 |
| 2021/0390816 A1* | 12/2021 | Vera | G06Q 20/3278 |

* cited by examiner

Primary Examiner — Allyson N Trail
(74) Attorney, Agent, or Firm — Joshua Kaplan, Esq; Kaplan Law Practice LLC

(57) ABSTRACT

The present invention is a system and a method enabled by the system. The novel system discloses at least one computer terminal. Ideally the system would have many such computer terminals, or kiosks, with at least one placed in a community center, a house of worship or some other location where a community gathers for social or religious events. Each such computer terminal is loaded periodically with a database managed by a first software application. The first software application, or a first instance of such software application, is deployed centrally and actively manages the database, performing such tasks as assembling the database with a plurality of objects received from publishers running a second software application or second instances of the software application. The manager then evaluates the quality and compliance of each object receives and forwards those approved to computer terminals located at various hosts. These computer terminals are utilized to garner attention of individual attendees of communal centers that are hosting the disclosed terminals. The attendees utilize the terminals, also known as kiosks, to access the collections promulgated by publishers to make financial contributions to these publishers. The manager is then able to apply commissions against the publisher to cover its fees and expenses and to pay commissions on each attendee-initiated transaction to the host where a transaction was initiated.

18 Claims, 39 Drawing Sheets

Duplicate

Delete

Archive

See all transactions

⊕ New Kippo

⊕ New Donation

⊕ New User

⊕ New Bar Code

Register

First Name    Last Name

John

Phone Number

+1   Phone Number

Email example@gmail.com

Password

••••••••

Password

••••••••

I agree to the Term of Use and Privacy Policy.

Create Account

Already have an account? ? Login

Fig. 25

+ Add a tag and press Enter

Yiddish Name

[ Shul Member X ] |

Current Tags  Clear All

[ Shul Member X ]  [ Shul Member X ]

[ Close ]

Fig. 27

Find Other Organizations

Back to Home

Enter other organization name — Find — Scan Barcode

A
B
C
D
E
F
G
H
I
J
K
L
M
N
O
P
Q
R
S
T
U
V
W
X
Y
Z

Keren Hashvees
יעדע ראש חודש וועט אי"ה
מפורסם ווערן די אלע וואס
האבן געקויפט

Rav Lehoshia
יעדע ראש חודש וועט אי"ה
מפורסם ווערן די אלע וואס
האבן געקויפט

Nachumas Yesroel
יעדע ראש חודש וועט אי"ה
מפורסם ווערן די אלע וואס
האבן געקויפט

Chesed - KJ
יעדע ראש חודש וועט אי"ה
מפורסם ווערן די אלע וואס
האבן געקויפט

Chibas Yerushalyim
יעדע ראש חודש וועט אי"ה
מפורסם ווערן די אלע וואס
האבן געקויפט

Mikvah USA
יעדע ראש חודש וועט אי"ה
מפורסם ווערן די אלע וואס
האבן געקויפט

Eizer Lmazon
יעדע ראש חודש וועט אי"ה
מפורסם ווערן די אלע וואס
האבן געקויפט

Bikur Cholem
יעדע ראש חודש וועט אי"ה
מפורסם ווערן די אלע וואס
האבן געקויפט

Bais Liflaitos
יעדע ראש חודש וועט אי"ה
מפורסם ווערן די אלע וואס
האבן געקויפט

Kever Meron
יעדע ראש חודש וועט אי"ה
מפורסם ווערן די אלע וואס
האבן געקויפט

Eizer L'Yeshivos
יעדע ראש חודש וועט אי"ה
מפורסם ווערן די אלע וואס
האבן געקויפט

Keren Hatzula
יעדע ראש חודש וועט אי"ה
מפורסם ווערן די אלע וואס
האבן געקויפט

Bais Liflaitos
יעדע ראש חודש וועט אי"ה
מפורסם ווערן די אלע וואס
האבן געקויפט

Kever Meron
יעדע ראש חודש וועט אי"ה
מפורסם ווערן די אלע וואס
האבן געקויפט

Eizer L'Yeshivos
יעדע ראש חודש וועט אי"ה
מפורסם ווערן די אלע וואס
האבן געקויפט

Keren Hatzula
יעדע ראש חודש וועט אי"ה
מפורסם ווערן די אלע וואס
האבן געקויפט

English

Krasna Willinamsburg   Close ✕

Select a Kippa:   319 Find 🔍

| | |
|---|---|
| Dinner Donations  301a | $19 |
| Main Dinner Fund  3012 | $19 |
| Sponsor a Child | -- |
| Main Dinner Fund | $19 |
| Sponsor a Child | -- |
| Main Dinner Fund | $19 |
| Sponsor a Child | -- |

← Previous (11)     Next (11) →

Give a general donation →

Fig. 29
 Mosdos Krasna BP
General Kippa / Dinner 2022 ⌄
Close ✕
Select amount:   ⓘ Donate for the great cause of yesomim to have shoes
$ Enter Amount
$5   $10   $20
$50   $100   $200
 Pay in Full
Your entire donation will be paid at once
 Monthly Installments
Split your donation into multiple installments
 Recurring Payments
Charge your card on a consistent basis
Continue to Pay →

Fig. 30

Give Daily, Until When?

Until I cancel

Specific amount of days

| 30 | Days

Your card will be charged Daily until 02/26/22

Done

SYSTEM AND METHOD FOR PROCESSING COMMUNAL AND PUBLIC COLLECTIONS BY UTILIZING A PUBLICLY ACCESSIBLE KIOSK

FIELD OF THE INVENTION

The present invention relates to a physical kiosk that is configured to facilitate communal charitable efforts and to process payments to other non-profit organizations that a user of the kiosk may be affiliated with, and which are presented to the user via a database to which the kiosk connects.

BACKGROUND OF THE INVENTION

Electronic public terminals, otherwise known as kiosks are presently being used fulfill the function of providing public information and limited commercial transactions. The best example of this is train, bus, or airplane information displays. In the past, these functions were carried out by staff of an information desk or using billboards, brochures and maps. Public computer terminals that are available today, offer very limited and highly focused functionality, often accompanied by some limited form of user input to direct the terminal to display some information that a user is seeking or to permit a user to complete a transaction offered at the terminal. Many of these kiosks are self-contained units, with little or no control from any central location. Each machine was serviced individually, with a technician regularly removing money and loading a fresh batch of print ticker or merchandize.

The function of a public electronic terminal is highly limited to one or two functions. For example, a kiosk at a bus terminal is used to purchase tickets for a particular bus company. A kiosk displaying information about the same bus company is usually a separate kiosk, and which does not permit user input.

The highly focused nature of the present-day public terminals, still require extensive configuration of each device. Once configured, each such device then becomes dedicated to a particular narrow function. Therefore, the computer kiosks that exist today are poorly suited for communal centers. In general, communal centers are funded with contributions from their members. These contributions are raised using a system of dues or in specially tailored short term fundraising campaigns. Furthermore, community members utilize communal centers to raise funds for specific communal center initiatives, or to raise funds for a plurality of charitable causes that are not financially or socially affiliated with a particular communal center. To save on resource and to sustain community initiative, these campaigns call for rapid mobilization and a short duration. Thus by the time a standard kiosk known in the industry is instrumented with a particular initiative, the fundraising course would have been long gone.

There are of course standard charities that may benefit from a monolithic nature of a present-day kiosk. These charities are permanent fixtures in the communal life and are able to tolerate to relative long instrumentation time for a kiosk. However, to maintain interest and initiative, even such charities may benefit from new or novel campaigns designed to reinvigorate interest. Therefore, even stable and well-established communal projects are poorly served by a static standalone kiosk that is available today.

At the same time, a public kiosk in a communal center can be a very powerful tool not only as public announcement board and as means to promote charitable causes, but also to raise funds for various individual initiates and to generate revenue for the communal home itself. A kiosk of this type is usually placed in a high traffic area, such as the main entrance, lobby or commonly used hallway. Chiming and flashing icons can attract passersby, who can then easily and often anonymously register their contribution. The computer terminals known in prior art generate revenue for the local center by making it easier for members and visitors to contribute.

An additional limitation of the present art is that public computer terminals are highly localized. Meaning, the computer terminal in one house of worship may be configured for that house of worship, and perhaps carry out one or two other functions that are related to the same house of worship but will not be aware of any charitable initiative at a civic center nearby. If a member goes to that civic center nearby and sees a kiosk, that kiosk will serve that civic center and will not be aware of any charitable endeavors being undertaken at the neighboring house of worship. Notably, the house of worship and the civic center are often working together on common goal, and even fundraise together. However, this ability is presently hampered by the lack of common integrated platform that can serve multiple unique causes and which can be very quickly instrumented to support a plurality of different projects very quickly, almost in real time.

SUMMARY OF THE INVENTION

In its most basic form, the disclosed electronic device that runs a software application, which enables the payment of collections, tuition payments or donations to a plurality of recipients. The electronic device is preferably located in a public place and is accessible by the transient public. The electronic device may be self-contained, defining a list of payees and may permit the creation of logins for payors. The electronic device preferably provides the super user or device manager interface and the general collection interface. The super user/manager interface is related to or even part of the software application, but which provides management capabilities to the payees, whose collection is listed on the electronic device, or to the manager of the electronic device who is managing a collection on behalf of the payee. Likewise, the user interface is preferably an extension of or connects to the software application executing on the electronic device and which provides a user with the ability to search for payees and make payments anonymously with respect to the electronic device, but identifiably with respect to the payee. The electronic device may be configured to support user accounts and may keep track of payees specific to that user, so that a user will be provided with electronic facility to combine bills, collections, pledges and tuition obligations into one bill that is paid in a single transaction and then dispersed among payees by the electronic device.

The novel system further discloses at least one computer terminal. The disclosed system would preferably have many such computer terminals, or kiosks, with at least one placed in a community center, a house of worship or some other location where a community gathers for social or religious events, or any type of public location. Each such computer terminal is loaded periodically with a database managed by a first software application. The first software application, or a first instance of such software application, is deployed centrally and actively manages the database, performing such tasks as assembling the database with a plurality of objects, determining, preferably with user input, which object should be loaded to which computer terminal, and combining such selected objects for that computer terminal into a list of objects, which then form a local list that is provided to a second software application, or a second instance of computer application, running on the computer terminal. Understandably, envisioned are a number of such lists, with each list being sent to a plurality of computer terminals running at "like minded" or similar community or public locations. The disclosed components, such as the central management, database and first, second or third software applications may be self-contained on a single device or spread across two to several autonomous or semiautonomous devices. The database is preferably a customized data storage using arrays, hashes and tables or other customized small footprint adaptations that maximize system resources using lean operating consumption.

Each object in the database may further be comprising of sub objects, such as lists and sub lists. The object itself is preferably created by a third software application, or a third instance of the software application. The third instance of the software application in running on a computer device of a publisher of the object, where the publisher of the object represents a charity or another charitable cause of the same charity. The object may also be an announcement, a bill to be paid by a targeted group of people or a specific individual, a matcher of potential contributions, or some form of tracking data. The second software application assigns an identifier to each object and to as many subjects of the objects as the publisher may desire. Each identifier marking a separate initiative or collection of the publisher. The identifier would later be used to quickly paint the specific object or initiative marked with the identifier at the computer screen when an attendee at a communal location uses one such computer terminal.

The third software application then contacts the first software application and sends all objects, sub objects and their identifiers to the first software application for storage in the database. It should be noted that one of the objects must necessarily contain publisher's account information so that the publisher of the first software application may utilize such account information to later collect a commission and any other fee from the publisher of the objects. It should be noted further that some of the objects are created new or updated, while others remain static. The first and third software application maintain a running status to ensure that only the appropriate objects are updated, removed or left untouched.

The first software application than assesses the object received from all publishers and assembles them into a list of objects, with each list containing combination of object as dictated by location, preference or other practical reasons of the publisher of the first software application and the host of the second software application. Once a list has been assembled, it is sent by the first software application to the second software application running on each computer terminal.

Preferably, each computer terminal having at least one input reader configured to capture an identifier presented by a user at the computer terminal. The second software application then compares the identifier presented by a user of the computer terminal to any one of the identifiers uploaded to the computer terminal to determine whether any is associated with an object, a list or a sub list. The identifier is linked to an object, the second computer software presents the object on the screen of the terminal, where a use may use terminal's physical or virtual payment facilities to make a contribution to the charity stored within the object presented on the screen.

The publishers of the objects may now publish identifiers using magnetic strips, coded strips or bar coded streps that are transcribed unto cards, invoices, posters, brochures social media posts and webpages. The identifiers can be presented at the computer terminals and scanned by the scanner device on the terminal to quickly take the attendee trying to use the terminal to a page with the relevant announcement or collection. Notably, the identifiers may be directed at a group of people or at an individual holder. For example, a fund raiser for an organization may now enter a civic center with a request for a donation, and distribute cards bearing the appropriate barcode, which the distributees can now use at the computer terminal at the civic center to make their contributions. Another organization may utilize the disclosed system to distribute invoices for unpaid bills or pledges to specific individuals at the same or different civic center. These individuals may then avail themselves to the ability to pay their obligations at the computer terminals using print and electronic documents bearing the identifying code.

The computer terminal may contain several input devices. These may be bar code or magnetic scanners, proximity scanners or biometric scanners. The biometric scanners may consist of fingerprint or retinal scanners. All scanners may be used to either identify the object or to authenticate a user of the computer device (or a publisher of the object) with the first, second or third software applications. The scanner device may also have a secondary printer or device, capable of printing on a presented secure instrument, such as a bank check, or punch holes or reprogram magnetic strips. The purpose of the printer device is to invalidate a secure instrument being used at the computer terminal from accidentally being used again.

All payment and access information are communicated by the second software application to the first software application. This information is then used to a) process a percentage commission to the publisher of the first software application and to pay a commission to the host of the computer terminal where a payment had been made, b) to compile statistics for on performance or positioning of objects in the display areas of the computer terminals and c) to trigger payments to publishers from fund matchers. Understandably, such matching contribution would likely further prompt the first software application to collect commissions to the publisher of the first software application and/or further commissions to the host of the computer terminal where the payment was made. It is further preferable that the first, second or third software applications contain toggle functionality permitting a user of these software applications to change setting to a preferred language, with the software applications supporting at least two toggle languages. It is further preferably that users of first, second and third software applications are able to utilize their software applications to create and track user accounts with access to the respective software instances. The user accounts may further be assigned to magnetic or barcode identifiers, or as biometric identifiers, and uploaded to the database as additional objects.

The disclosed computer system enables a method for managing charitable collections comprising a plurality of steps that are instrumented at various levels by the software application executing on hardware supporting the disclosed system. The first step involves a first software application on a central location receiving an object from at least one third software application. The first software application then stores and catalogues the object in the database. The object so received comes from the third software application with an attached identifier. Once the object is catalogued, the administrator of the first software application specifies the push location of the object, with the software location then carrying out the push of the object to a specific terminal device or devices. The first software application groups each object into at least one push list. Each push list is then sent by the first software application to the desired second software application running on the computer terminal. wherein said computer terminal installed at a host, said host being a community location. The computer terminal will generally have a screen to display the list of objects, usually one or several objects at a time, that have been received from the first software application and are not stored on the computer terminal. The attendee standing in front of the computer terminal and viewing one or several objects from the list received from the first computer software. The attendee is then capable of submitting a payment on at least one object in the list. The payment is processed when the kiosk directs the attendee to the third party's payment screen located at a location separate from and unaffiliated with the first or second software applications.

The method described above may have additional steps of defining a manager who creates an object containing information regarding the desired collection, user authentication information, a public announcement, or a presentation preference information for the specific collection, user account or announcement. An additional step of assigning an identifier to an object, with the identifier assigned automatically or by the manager.

The disclosed method may comprise an additional step of the computer terminal issuing the terminal representing an object. The terminal can then be distributed to a plurality of attendees, who can then utilize the scanning capabilities of the terminal to make a contribution for the collection that is associated with the identifier presented by the user.

In additional step, the user may pay with a secure instrument, such as a check or money order, where the computer terminal will take custody or ingest a physical secure instrument, or a magnetic representation thereof and then cancel this instrument by writing to a paper-based instrument or recording additional magnetic messaging, declaring the instrument as canceled by way of payment.

It would further be preferred to have a step of the second software application configured to group objects by their popularity, either measured by amounts collected or number of times accessed, or by both of these factors. Additionally, a user would be able to change the language displayed on the computer terminal.

Still other steps of the disclosed method would contain the steps of recording a payment being made by a user on the terminal. This information is then sent back to the first software application, which utilizes the payment information in combination with an object containing publisher's bank account and other information, to collect an amount representing a portion of payment made on the terminal as a fee for using the first software application. And in a further step the object containing publisher's bank and personal information coupled with the payment amount will be used by the first computer application to collect a commission payable to the host of the computer terminal.

BRIEF DESCRIPTION OF THE DRAWINGS

FIGS. 7-30 are screen shots demonstrating some of the software steps in action across the three instances of the software application.

DESCRIPTION OF THE PREFERRED EMBODIMENTS

Figure 1:
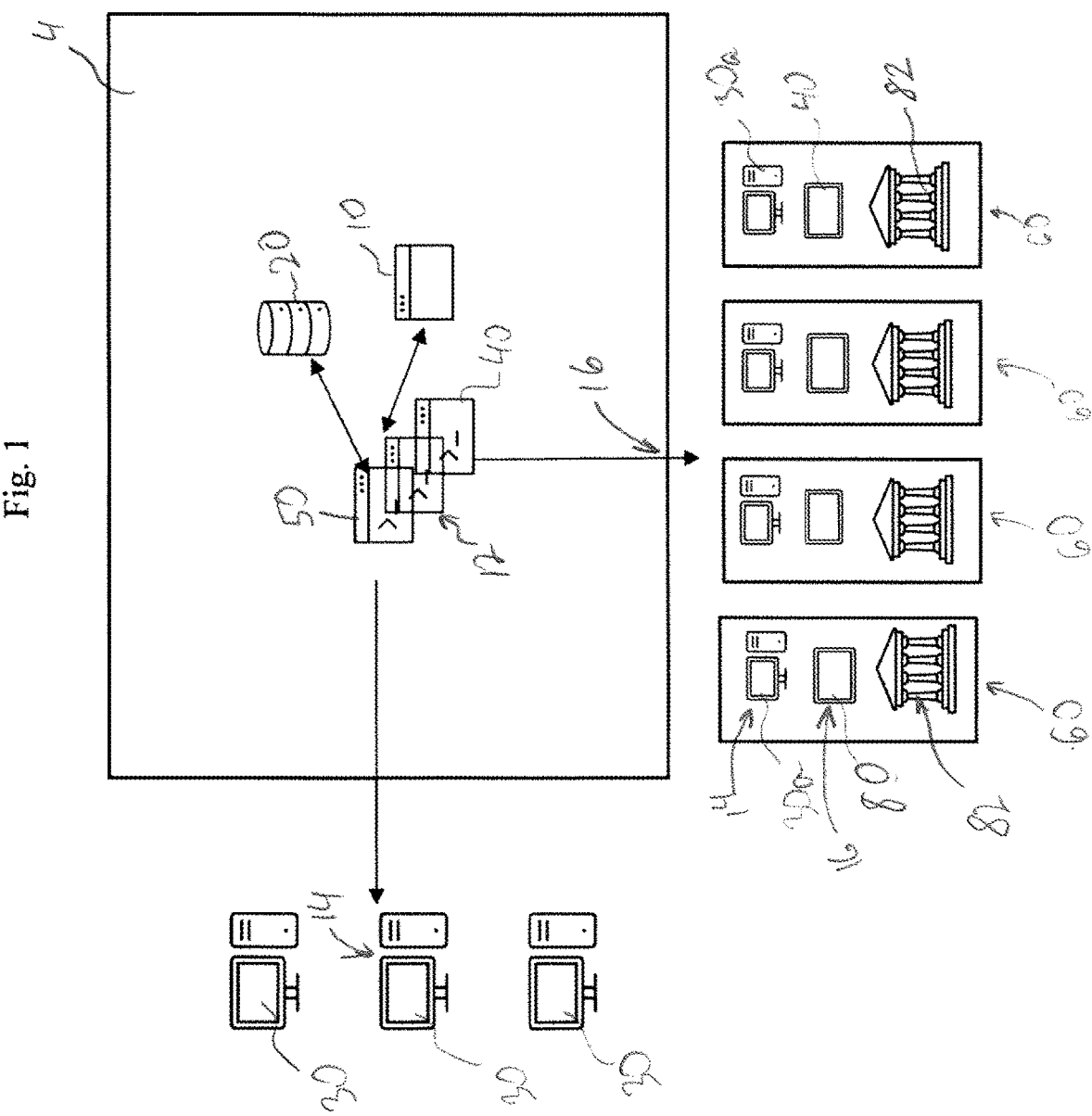
FIG. 1 diagrams the overall layout of the disclosed computer enabled system.

The preferred embodiments of the present invention will now be described with reference to the drawings. Identical elements in the various figures are identified with the same reference numerals.

Reference will now be made in detail to embodiment of the present invention. Such embodiments are provided by way of explanation of the present invention, which is not intended to be limited thereto. In fact, those of ordinary skill in the art may appreciate upon reading the present specification and viewing the present drawings that various modifications and variations can be made thereto.

FIG. 1 diagrams the initial steps of instrumenting the system and method of enabling a low intelligence public terminal to be a key fund-raising tool to a plurality of independent charities simultaneously. The system is comprised of an electronic device in the form of at least one computer terminal 80 deployed at communal location 82, which may be any public location. The computer terminal 80 is preferably a low-cost mobile enabled device, such as, but not limited to, a tablet computer running an iOS, Android or Windows Phone operating systems, as well platforms proprietary to the manufacturer, for example Samsung, Sony or Fire OS. Preferably, the computer terminal 80 also contains between eight and one hundred and twenty gigabytes and at least two gigabytes of random-access memory. The communal location 82 may be a civic center, a cultural center, a school, government building, a house of worship or any location not having particular access restrictions accessible by the public. The electronic device 80 preferably occupies a prominent spot in a high trafficked area of a communal center 82, and is accessible by anyone present at the center, with little or no authentication required from the user. Authentication to use the computer terminal 80 is not a strict or initial requirement of the computer terminal 80, as the computer application 50, or the controls of available on the operating system, or an additional software package limit user's activity to only those permitted by the computer application 50, which at the computer terminal level enables a user to identify a payee the user wishes to pay and make a payment on a facility provided by said payee. Alternatively, a user may be permitted to have a user account, which would permit a user to have a tailored environment or access to its payment accounts and payee accounts, etc.

Shown in FIG. 1 is a manager center 4, which is a start of point for the software application 50, and the seat from which the manager 10 controls the central software process and directs uploads to both the publishers 30 and the communal centers 82. The software application 50 is comprised of several main modules, which are preferably one application with instrumentation tailored for a particular functionality, such as the publishing purpose 30 or presentment purpose on the kiosks 80.

At the top level of the overall software application 50 is the first software application 12, which enables the management or super user functionality 10. The next level is the second software application 14, which permits publisher functionality, and the last level of application is the third software application 16 which runs at the terminal 80.

Many users of software application 50 may use a combined version of software application, such as the second software application 14 for the publisher 30 and the third software application 16 for the computer terminal 80. In a combined location 60 otherwise known as the host, the publisher 30 utilizes the second software application 16 to publish announcements and collections unique to the publisher's own communal center, for example, dues, facility upkeep fund, food and beverage fund, library fund, etc. The communal center publisher 30a may direct such announcements/collections to the software application 50 to be directed by the manager 10 to the publisher's computer terminal 80. Alternatively, the publisher 30a may be able to direct its collections and announcements directly from the second software application 14 where such announcements/collections are created to the third software application 16 where such announcements/collections are presented to a user. Notably, the first, second and third software applications 12, 14 and 16, respectively, may execute on a computer device as a single application, and function as the active module for a particular purpose.

Figure 2:
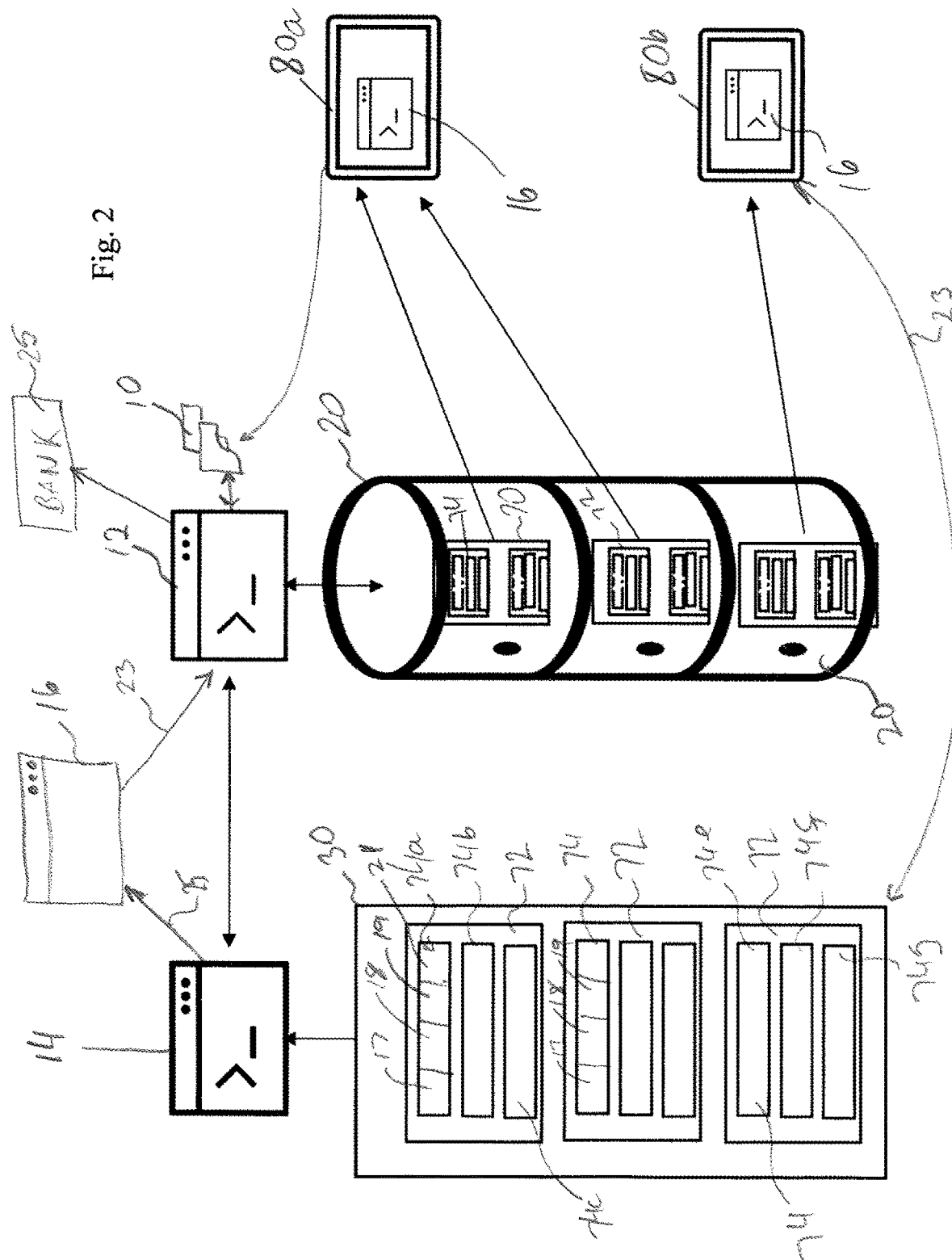
FIG. 2 is a diagram of flow of objects between the first second and third instances of the software program.

FIG. 2 demonstrates the process of flow of the disclosed computer enabled method. The publisher 30 utilizes the second software application 14 to create objects 74. Each object 74 may be a collection 74a, an announcement 74b, a banking or account information about the publisher 30, or any other segment of data. An object may also be a multi-tiered object 72 having an object 74e having a list 74f and a sub list 74g. An example of multi-tiered object 72 would be a charitable collection fund having an overall collection and several sub-collection projects.

Each object 74 is configured by the software application 14 to be presented for viewing by a user at the computer terminal 80. Therefore, each object 74 would contain at least a data segment 17 containing the actual message of collection, which may be simple characters or embedded objects, such as audio and video files for short presentations. Notably, a collection may be a character combination, a banner or a datafile. There may be additional segment of data 18 containing an address to the payment facility of the publisher 30. One example of a payment facility would be a page exposed via the internet presented by the publisher, or a third party on behalf of a publisher, that is instrumented to collect payments via secure instruments, such as credit cards or printed secure instruments, such as checks and coupons or via electronic bank transfers.

The data segment 19 may be the identifier. The identifier preferably a random address that is unique to the particular object 74. Therefore, all objects 74b-74g would each have their own identifier. The software application 50 and each first 12, second 14 and third 16 instances of the software application are instrumented to isolate and work with the identifier to quickly and directly locate the object 74. Incidentally, the ability to effectively isolate the identifier segment 19 in every object 74 is what enables a user at computer terminals 80a or 80b to access the object 74 having a particular identifier, without searching and without needing any authentication of the user executing the identification. Therefore, a publisher 30 utilizing the second software application 14 would create an object 74 having whatever data 17 and 18 and generate an identifier. The identifier can then be published separately and issued to relevant users who can then access the object 74 from any of kiosk 80a or b provided that the object 74 is transmitted to the kiosk. There may preferably be at least an additional data segment 21 which may store things like location on disk, network address of publisher 30, bank and payment information of publisher 30 and the identifier information. Segments 19 and 21 are utilized by the first software application to organize the database 20, while the manager reviews data segments 17 and 18 for content and compliance.

The publisher then utilizes the second software application 14 to present the objects 74 and multi-tiered objects 72 to the first software application 12, which then stores the objects 74 within lists of objects 70. The lists are created by the manager process 10. The manager process 10 would be an automated or a manual process having direct human intervention. The manager reviews the data sections 17 and 18 to determine category and qualify of information, its relevance to some communal centers versus others and propriety of information with rules promulgated by manager 10 to all or some of the publishers 30. The manager 10 combines the objects into lists of objects 70.

The computer terminals 80a and 80b each represents a computer terminal at a communal location in a different community or setting. Therefore, some list 70 may be appropriate for the computer terminal 80a and computer terminals similar to it, while other lists 70 are more suitable to the region, location, demographic, function or any other factor of a communal location hosing the terminal 80b. The lists 70 and objects 74 are then stored locally on each computer terminal 80 by the third software application 16, which presents an appropriate object 74 to a user. The user then utilizes the information provided in an object 74 to access the payment or informational utility provided by the publisher in action 23. The third software application 16 is then instrumented to record the outcome of the action 23. For example, in cases of payments, the amount of the payment, or a acceptance of the payment method. The result of the action 23 is reported back to the first software application 12 to produce reports for the publisher 30 or for the computer terminal 80, or to access the bank accounts 25 of the objects publisher to collect its commission, or the commission on behalf of the host of the computer terminal where the payment was made.

Notably, the publisher 30 may provide object data directly to its local third software application 16a. In some or all cases the action 23 of the third software application 16a may still be reported to the first software application 12 for report compilation and commission collections. It should be noted that the model shown in FIG. 2 is dependent by connectivity provided by the internet. It should be further noted that the model described in FIG. 2 allows community information or charitable projects organized by one publisher 30 to be championed by all or some targeted communal locations with very little effort from users at such communal locations. In a space of a few minutes a user at kiosk 80 may be able to support a plurality of different and disjoined initiatives and support the building campaign of the host of the kiosk. Such a joined activity and the speed with which it can be conduct would be impossible to replicate manually without the utilization of the software application 50 and the topography of the first, second and third 12, 14, 16 software applications.

Figure 3:
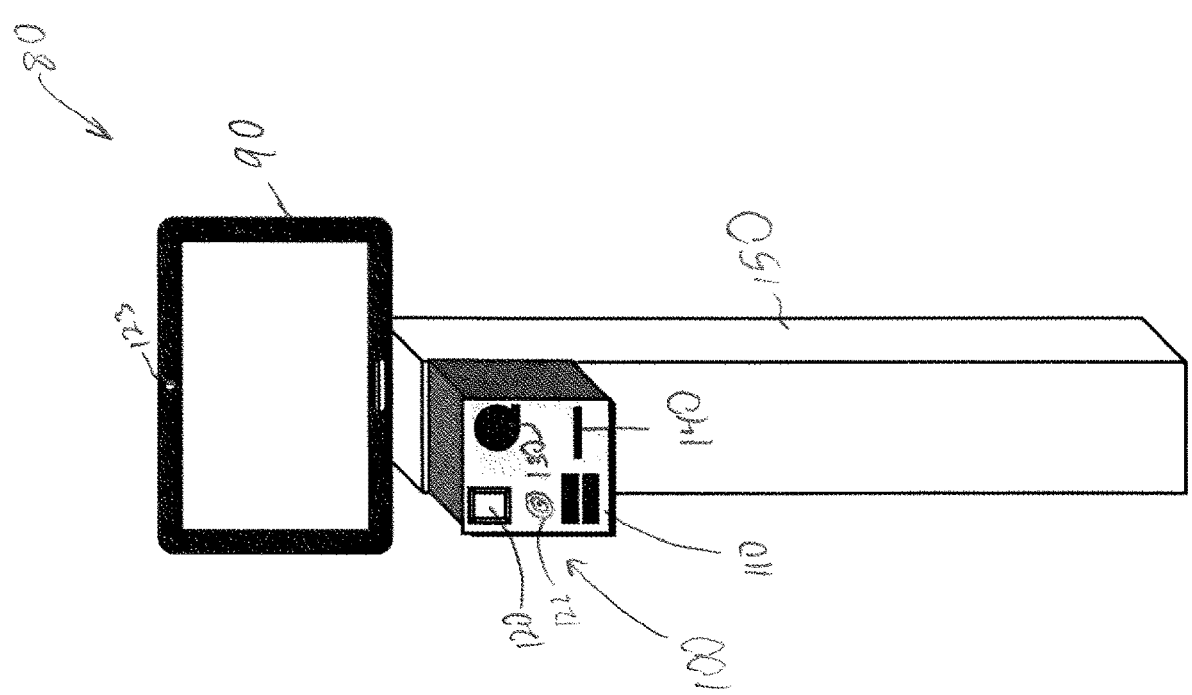
FIG. 3 is an embodiment of a computer terminal, also referred to as a kiosk.

FIG. 3 demonstrates one of the embodiments of the computer terminal 80. Shown is the screen 90, which may likely be a tablet computer device. The tablet computer device may also partially function to provide a user with a keyboard on the screen. The action center 100 preferably presents a number of inputs and outputs. Shown are just some of the plurality of user inputs and outputs that may be included, such as but not limited to, a proximity card reader 120 a ticker and/or receipt printer 130, a biometric scanner 140, and card reader and/or a paper intake scanner 110. There may also be a voice recorder 122 to feed information to terminal 80 via voice commands. The computer terminal 80 may be utilized by the software application 50 as a communication device between user and other parties.

Figure 4:
FIGS. 4 and 5 demonstrate a detailed diagram describing the flow of information.

As demonstrated in FIG. 4, the second software application 14 is capable of instrumenting an object 74. The object is then assigned an identifier 19*a*. At this point the second software application 14 may create one or more sub lists 74*a*, which would be identified by the identifier 19*a*. Alternatively, a separate identifier 19*b* may be assigned to each sub list 74*a* or several sub-lists 74*a* together and identify the object 74. The identifier 19 may be used by the publisher to capture a targeted user's focus on the primary objective of the object 74. For example, if the main object of a non-profit school is to raise funds, and these finds will go to pay to maintain an existing structure and pay for staff, but paying staff represents a much more pressing need, a publisher may create an overall collection 74 and then create two additional sub objects or sub lists 74*a* representing building maintenance and salaries. The publisher is then able to create an identifier designed to bring a user to the salary screen first to demonstrate an especially pressing need. Alternatively, each project has its own identifier. It should be noted that an identifier 19 is a random address comprised of a unique sequence of characters, an identifier may also contain a database location, or any other information designed to identify an object it represents with the first software application 12 or the third software application 16. The identifier can then be printed to a target user in a form of a bar code or a readable magnetic strip or provided as a proximity chip. The identifier may be placed on a card by itself as will be demonstrated in this application or placed in form of a magnetic strip, character sequence or bar code on any memoranda that is then distributed to a targeted user(s) in a separate step.

Furthermore, demonstrated in FIG. 4 is objects 74 and multi-tiered lists 72 would originate from separate publishers, each utilizing its own instance of the second software application 14*a* and 14*b*. The first software application 12 would store each object by itself and link them together in lists as determined by the manager 10. The list of objects or several lists or individual objects would then be sent to a computer terminal 80 to be received and stored locally by the third software application 16. The periodic uploads 27 may occur at whatever terminals determined by the manager 10 ranging from periods spread by several minutes, several hours or several days.

Figure 5:
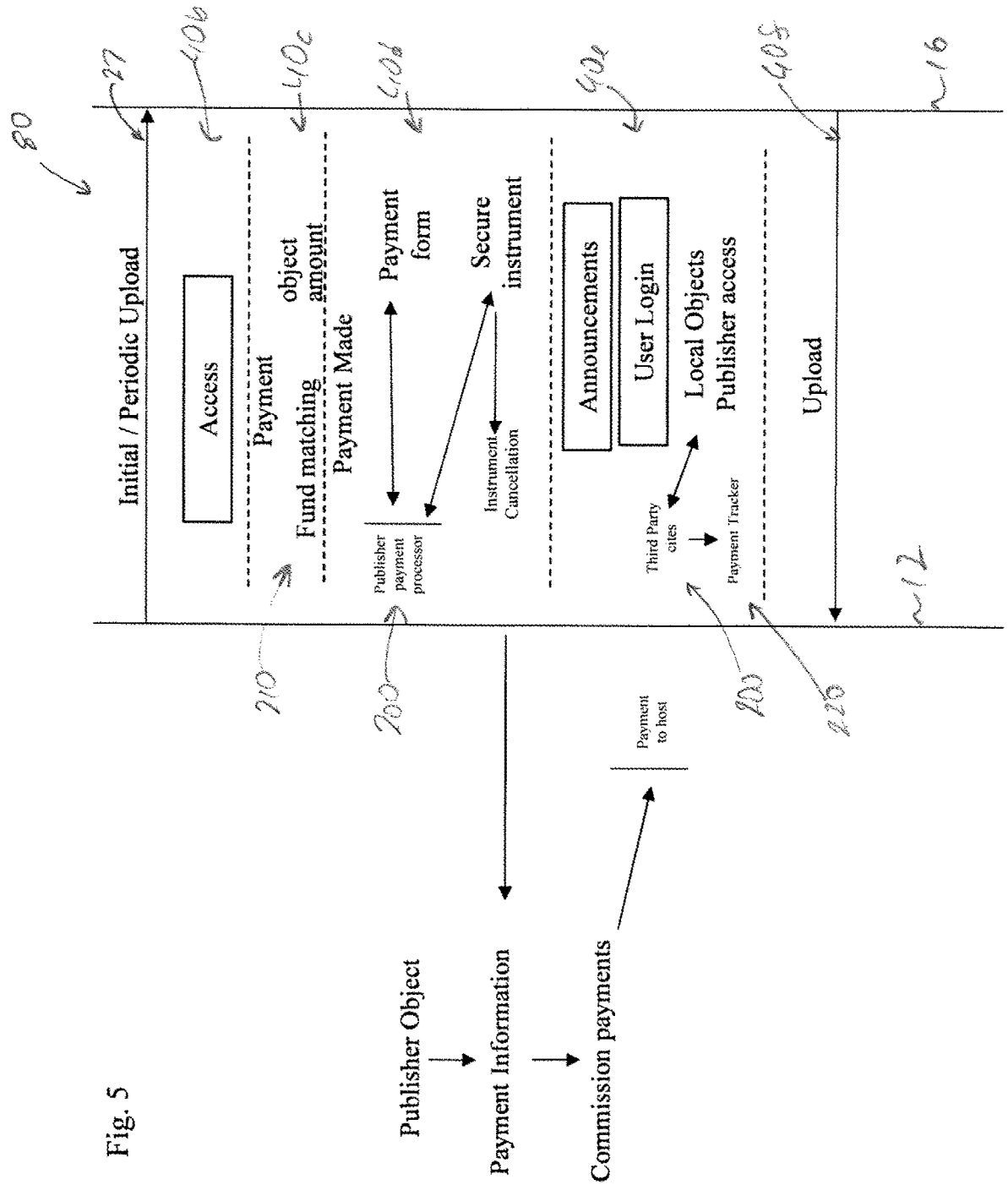

FIG. 5 demonstrates the process from the perspective of third software process 16. While most of the publishing and object control is performed by the first and second software processes 12 and 14, the third software process 16 is the presentation level where the listed objects generate revenue for the publisher, as well as commissions for the manager 10 and the host each computer terminal 80, also referred to as kiosk.

After periodic uploads 27, the kiosk 80 is instrumented in handling user access 40*b*, payment solicitation 40*b*, payment processing 40*d*, message display and logins 40*e*. Each action by the third software application 16 modifies an uploaded object or creates a parallel object which contains a record of actions. The modified or parallel objects are recorded by the first software application 12 during the periodic transfer activity 40*f*.

The user access 40*b* may consist of a simple walkup to a kiosk 80 and engaging the screen. The kiosk 80 may be configured with motion sensor to detect movement within a predetermined distance away from the kiosk 80, to a) attempt to capture attention of the passersby or b) awaken the screen when an approaching user is within operational space in front of a screen. Preferably, the third software application 16 is instrumented with an internal calendar that is configured to disable all or some of the features of the kiosk 80 during certain days, such as a Sabbath mode.

Park of the access step 40*b* is the search that enables a user to locate the object of the user's interest. This may be assisted by the third software application 16 using uploaded data, or data generated locally by the third software application 16 and is based on popularity of a certain object. This popularity may be based on number of times searched or accessed, the amount of funds contributed by users in a single transaction, or an aggregate collected, or all these factors together, or these factors in addition to other important factors. The user may be assisted by the object listed first based on decision of the manager 10 at the upload, with this decision being sensitive to the preconfigured preferences of the host of the kiosk 80 or the manual intervention by manager 10 or host of the kiosk 80. The objects listed prominently on access by a user may also be controlled by an auction process, displaying objects prominently based on a bidding auction, or a factor-based auction or both. For example, during creation of an object 74 a publisher 30 would determine a highest bid it would be willing to pledge to keep a certain spot in the list of objects appearing at designated number of host or a designated region or those hosts fulfilling certain conditions, such level of adherence to religious tenets by visitors of a certain hosts or a demographic of the visitors of certain hosts. This would an example of bidding auction. The contemplated auction could be a factor-based auction, for example, if an object is created by one or several publishers of particular importance or influence in a community. An object created by such a group would carry greater prominence than object created by a singular publisher representing interests of an individual or a small group of people. This would be an example of factor-based auction. The two types of auctions may be combined to mediate a conflict between high paying or high importance objects.

Once a user has located the object of interest, either by search for it manually using a keypad or voice receiver provided by the kiosk 80, or by scanning a user's identifier code for a particular object using one of the kiosks input features, such as the proximity reader 120 or the card reader 110 or the code scanner 122, the user is now ready to take action, preferably by submitting a payment on an object.

Preferably at the payment acceptance stage 40d the user's session is transmitted to an e-commerce page, or a collection webpage included as a link in the object being viewed. The payment processing by the publisher's payment processor 200, which is not instrumented locally at the kiosk level 80 or at the manager level 10. It may be instrumented at the publisher level 30, or at a third-party site working for the publisher of the object responsible for a particular payment being made. However, the third software application 16 is configured to capture the actual payment activity, such as time of the access, number of occurrences of such access, the amount paid each time, type of payment method used, etc. All such data is stored locally by the kiosk 80 using the tracking module 220, by storing this information within the objects responsible for such activity or in a parallel object crated by the third software application 16 and transferred to the first software application 12 for recording at step 40f.

A portion of the payment processing is geared to be handled at the level of the third software application 16. This portion includes but is not limited to the processing of the secondary payment by a matching publisher 210 and/or the recognition and cancellation of secured instrument 230 used in some of the user payments. The matching publisher 210 may be created by a publisher 30 and transferred to the kiosk 80 during an upload 80. It may also be created directly at the kiosk 80 by a user using a local matching module 210, which creates a local object 74, containing configuration details, where the entire local object 74 including capture information from the matching transactions of this particular local object 74 being transferred at step 40f. In either instance, the matching module 210 is triggered when a user selects a preconfigured object that is the target of a particular matching campaign and submits any payment, or a payment of a certain denomination, as is preset in the matching conditions. The local object is then used to determine commissions 240 for manager and host of the kiosk 80 as well as to compile reports and create statistics that are then fed back to the kiosk 80 at uploads 27 and offered as informative information to a user, or as means to suggest or display objects to a user based on their popularity, as explained above. The user's environment preferences, such as language used for display of objects and other operations that is determined with access stage 40b effects all objects and operations subsequently displayed, including translation of object features presented to this user and processing features, namely payment collection and informational display. The third software application 16 will also translate the payment screen of a publisher 200, to an extent permitted by a particular payment processor.

In the embodiments where a host 60 (FIGS. 1 and 6) creates user accounts, the third software application is configured to authenticate users using card reader 110, the biometric sensor 140, a voice recorder 122, a facial recognition and motion detector 123 to accept user input and then interpret said input to determine authentication level of such user. The user account presentment and servicing occur at step 40e of the third software application. The authentication feature is preferred to support functionality, such as interval-based pledges or collections based on individual, or head of household, such as member dues. A user may easily be able to track his/her account status by viewing the same using his/her account. The account information is preferably created as a local object 74i (FIG. 6) and managed by the host 60. Or it may be created by the host 60 to be managed more centrally by the manager 10.

Figure 6:
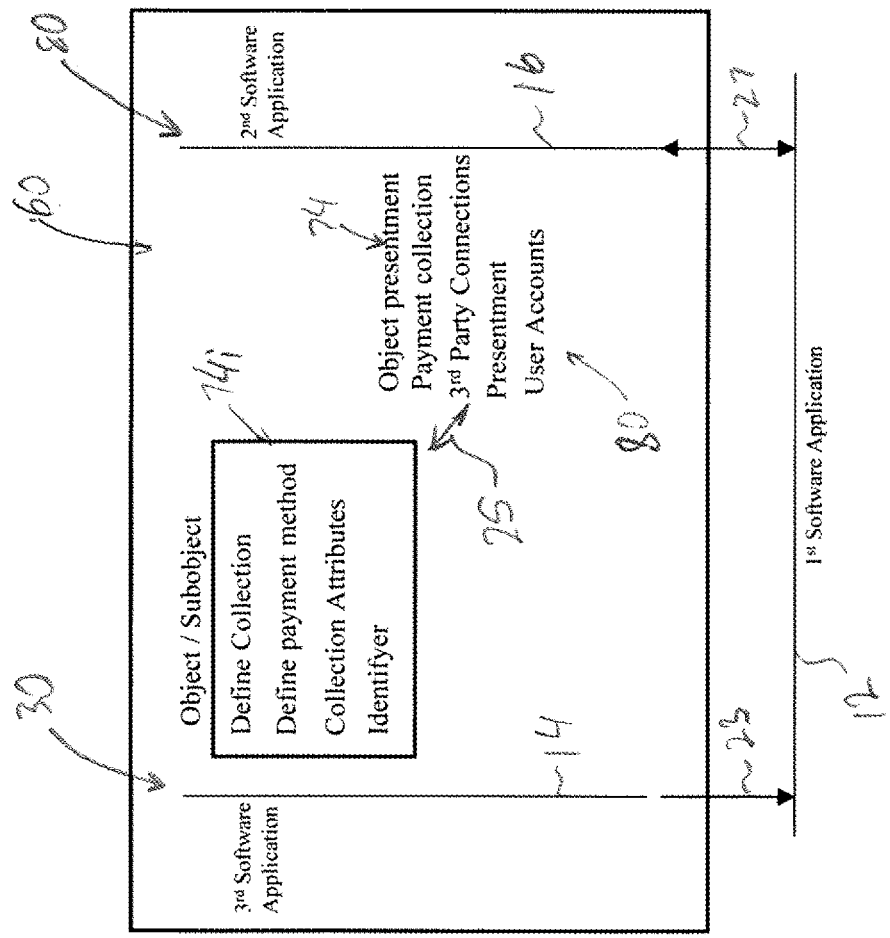
FIG. 6 is a diagram of a host, which usually includes the functionality of a publisher and computer terminal.

FIG. 6 demonstrates the often-combined nature of the second and third software instances or applications 14 and 16. Very often this combined location 60, describes a host of a kiosk 80, where a host displays objects 74 uploaded to its kiosk(s) 80 from the first software application, as well as its own collection and announcement local objects 74i containing information regarding collections, the identifiers of such collections and announcements presented to a user at kiosk 80 after a local transfer 25. Notably, the local object 74i is preferably published to the first software application in the transfer 23 and then uploaded using the upload 27 to computer terminals 80 present at other hosts 60. The combined location or a host 60 may feature a computer(s) running a Windows, Unix/Linux or iOS based computer executing the second software application 14 that publishes a local object(s) 74i. The second software application 14 also presents the statuses and results of collection efforts achieved by a local object 74i or an object 74 created only for publication to other hosts. For example, if the local object 74i creates a local collection object for the local ritual bath facility, the creator of such object on this host would be able to view the results and totals collected as the result of this object.

Figure 6A:
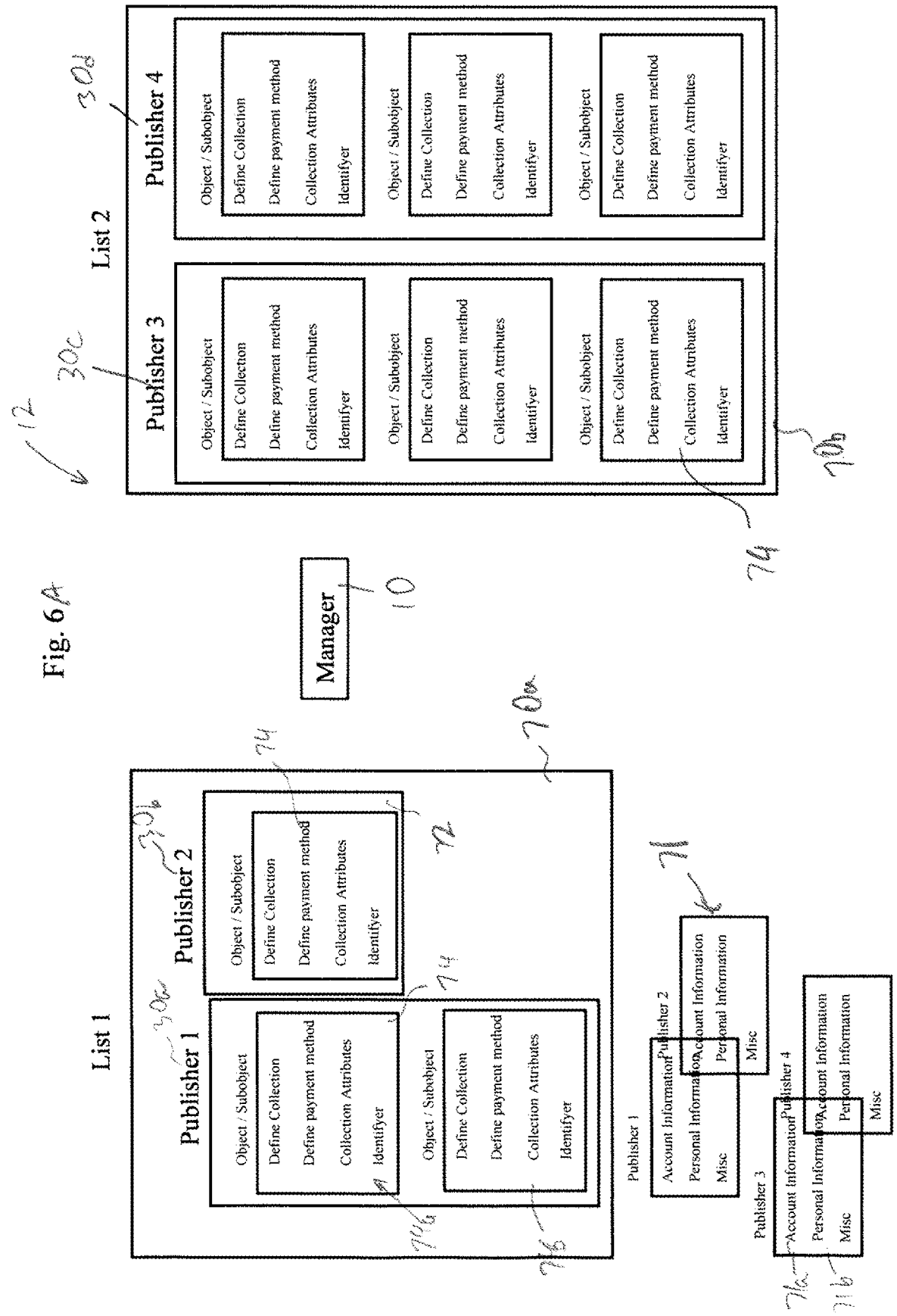
FIG. 6A demonstrates a combination of objects into lists for distribution to various computer terminals.

FIG. 6A diagrams one of key features of a manager process 10, which may be an automated process, or a user interface used by a human superuser to control the flow of objects 74 and to direct these objects 74 to specific hosts 60. FIG. 6A demonstrates that objects 74 are received by the first software application 12, with each object 74 defining a collection, a payment method, an identifier and a plurality of other attributes. The collection may by any other message or action distributed to a publisher. The manager 10 can then Bundle the objects 74 and multi-tiered objects 72 (comprising objects 74a and sub lists 74b) into a first list 70a. The manager then combines objects from publishers 30c and 30d into a second list 70b. The manager 10 will combine additional objects 74 into new lists or add them to these lists. The manager 10 will then determine which hosts 60 each list or lists may be sent to. This determination may be based on geographic or social considerations. For example, the importance of some objects to a particular locale or community, the purpose of the object or the optimal target group for the objects within each list. Secondary objects 71 represent secondary information for each object 74, such as an objects payment account 71a from which fees and commissions will be deducted by the manager. There may be a publisher or user's personal information, such as user accounts. These may also be information received from the third software application 16 containing tracking data. The secondary objects 71 are also stored in the database 20 and fulfill and administrative and tracking role for the manager 10.

Figure 6B:
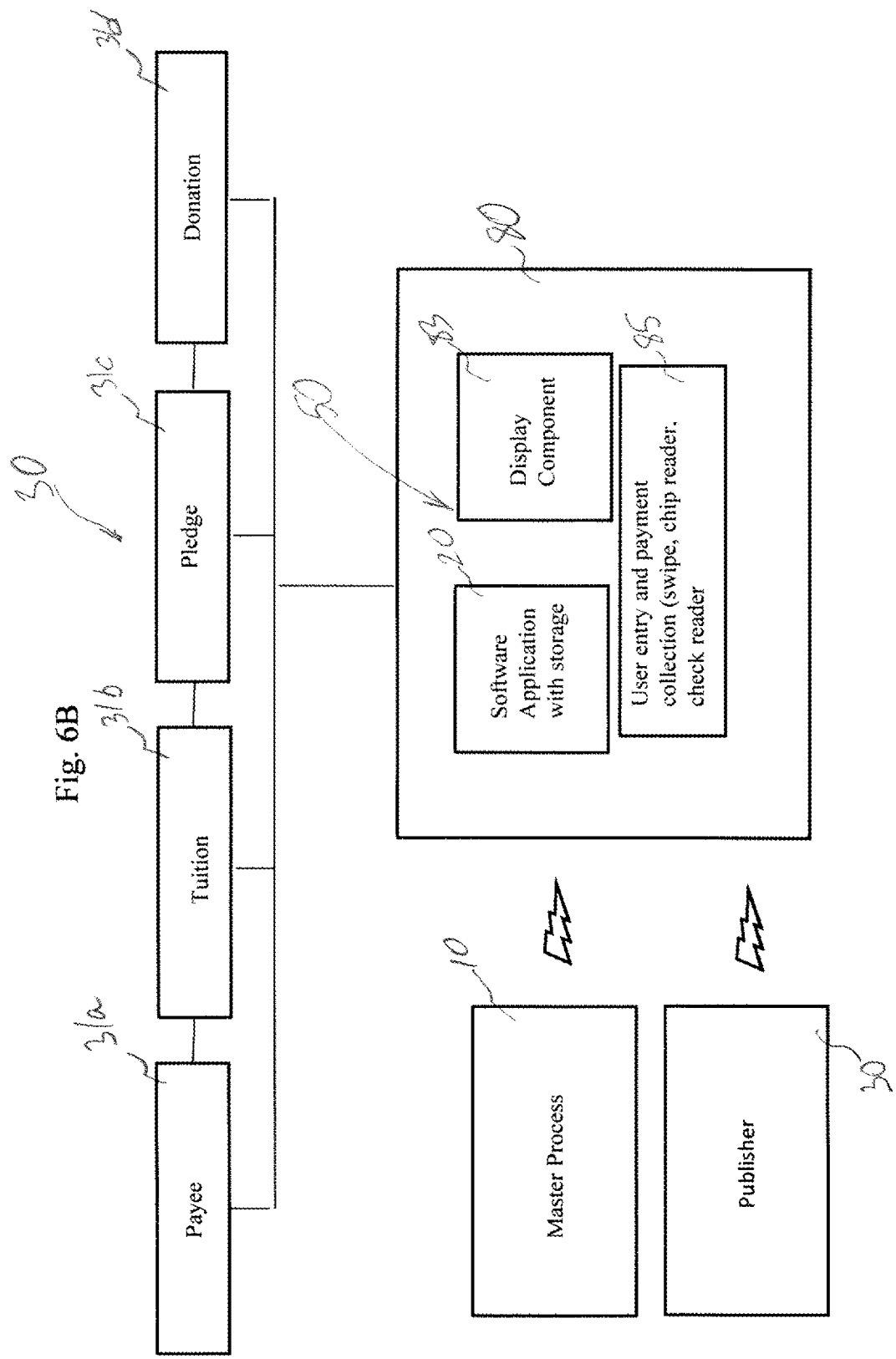
FIG. 6B demonstrates a self-contained kiosk providing the capability of paying multiple payees, as well as advance searching with suggestions.

FIG. 6B demonstrates a system comprising of at least one electronic device 80 which may be autonomous or semiautonomous and is instrumented to facilitate fundraising 31a, or collections 31d or pledges 31c or tuition payments 31b. Any of the publishers may also provide an opportunity to an attendee or user of the electronic device to participate in a communal function, such as, but not limited to, obtaining or creating community announcements, offering help or volunteering at a community project, paying dues, or making lost and found announcements. The master process 10 and each of the publisher processes 30 may be executing on a separate device or on an appropriate module on the electronic device 80.

The software application used to pay one or many payees, also known as publishers 30. The payees 30 may be from the same or different organizations. The software application 50 is instrumented for entry of each publisher 30 for storage 20 and presentment to user on the display 83. The electronic device 80 would then have the user entry component 85 to obtain a payment or response from a user in a form not limited to a keyboard entry, a screen keyboard, keypad, magnetic strip reader, cheap reader, scanner of a secure instrument (e.g.: a bank check), or a voice entry.

Figure 6C:
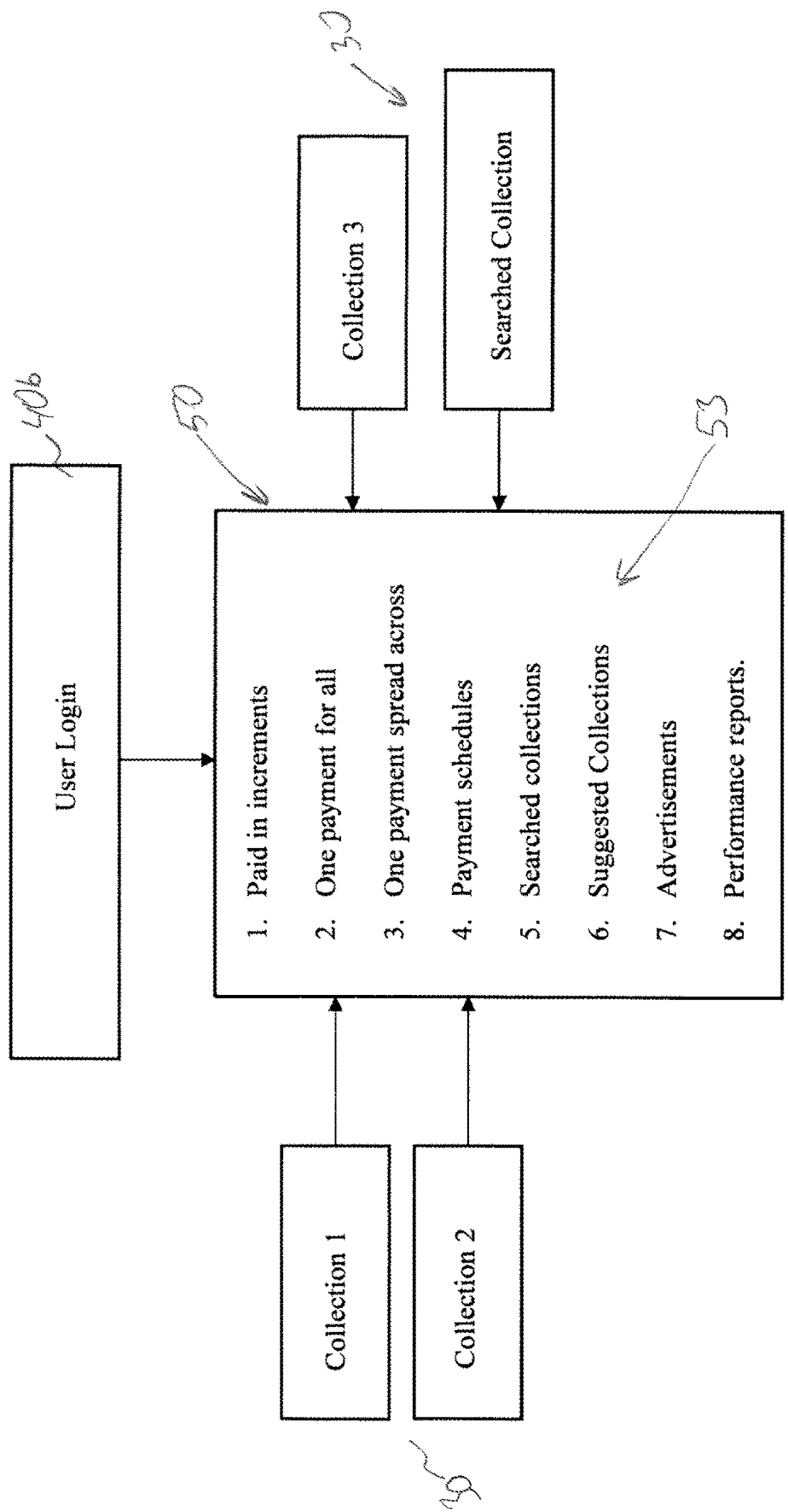
FIG. 6C is a diagram of the user interface that enables multiple payment options.

As illustrated in FIG. 6C a user may have a login 40b. The software application 50 may tie all publishers 30 to the login 40b. The login can be accessed using user credentials, bar code interpretation or magnetic chick or strip detection, or via biometric readings, such as retinal, ear or fingerprint scan. Shown in FIG. 6C are collections 1-3, which may be populated at user request or provided by publishers 30. The collections 1-3 may be associated with a user login or may be derived from a record of prior browsing activity, prior giving pattern or outstanding pledges. A user may be able to add to the list of collections using searches.

The software application 50 may be further divided into a first software application for management processes, the second software application for publishers/payees 30 and the third software application for user display, payment processing and user input. The software application is configured to enable users to a) schedule each payee 30 separately; b) issue one payment; c) pay all payees 30 at the same time; d) breakup the payment into specific amounts for each payee; e) configure a payment schedule, interval and term for each payee. All payment arrangements would be made to all payees 30 simultaneously or configured separately for each payee. Preferably, the software application is instrumented to enable each payee, also known as the publisher 30, to determine whether to accept an incremental payment, a payment arrangement, a reoccurring payment, a suggested payment amount, or a preconfigured payment amounts instead of a user selected payment amount. This information may be supplied to the software application as one of the object attributes.

The software application is also instrumented to perform searches for publishers 30 at the request of the user and provide suggested results, especially in the event that a sought-after publisher had not been located, or a user appears to have misspelled or incorrectly referred to a publisher who was otherwise present.

In the background to displaying of all publishers and payment processing, the software application 50 running on at least one electronic device 80 is also able to provide advertisements, which may be configured to display based on hour of day, day of week, week/day of month or based on year, time of year, season, or proximity to a particular time, holiday or season, or displayed based on any other criteria.

Figure 6D:
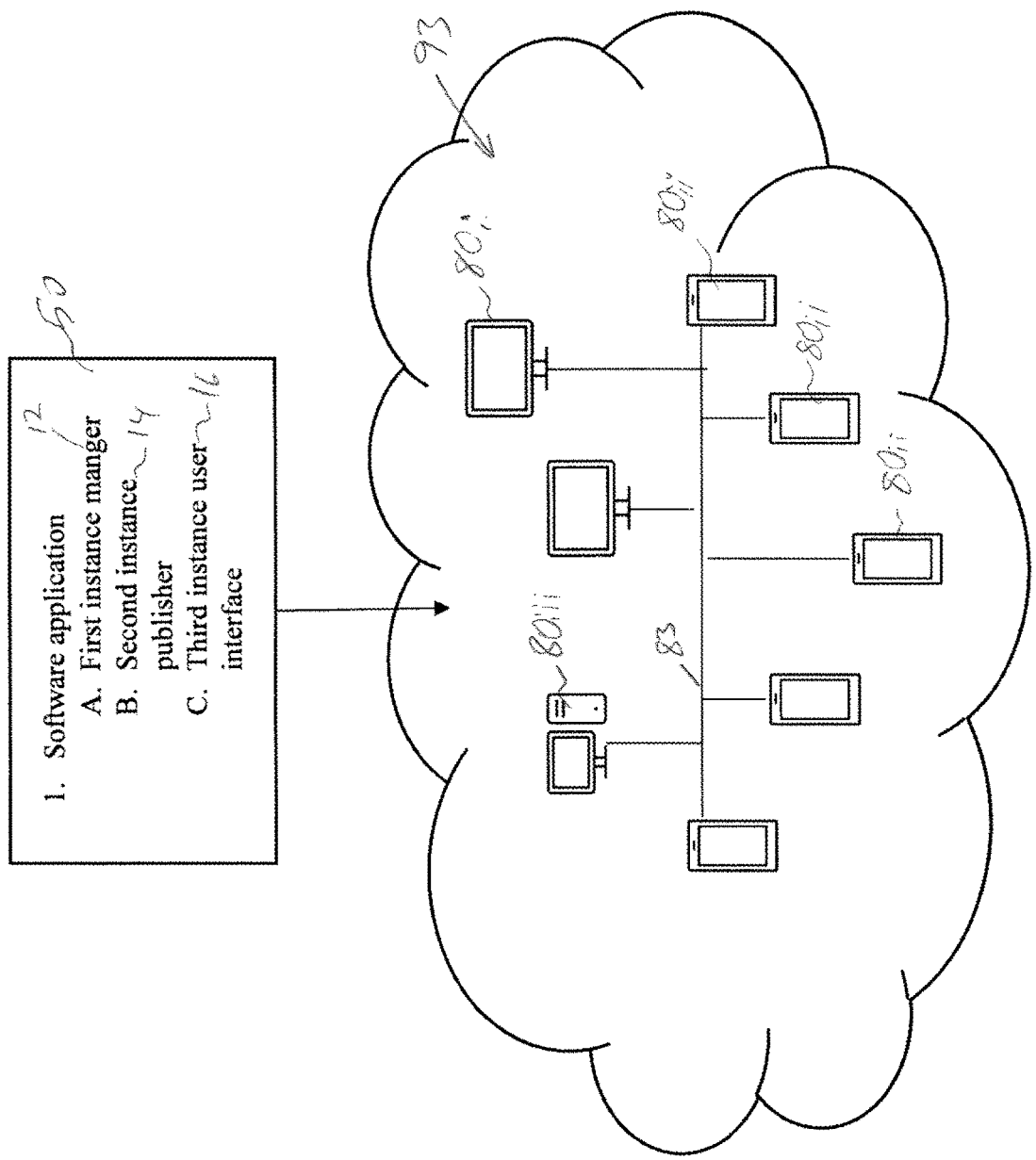
FIG. 6D demonstrates the portability of the disclosed application, which can execute in a client server environment or as an amalgamation of independent or systemic devices.

FIG. 6D demonstrates that the software application 50 may be comprised of the first instance or first software application 12, the second software application 14 or the third instance or third software application 16. Each instance of the software application 50, or the entire software application 50 may be loaded onto a server or a desktop computer 80iii, a mobile phone device 80ii or a tablet device 80i. It may also be loaded onto a device that is specifically built to support the functionality of the software application 50. The devices in the cloud 93 may operate on the same operational bus 83, with some devices serving as publishers 30 and some as electronic devices 80, with at least one managing device 10. Alternatively, the devices shown 80i, 80ii and 80iii may each have the entire software application 50 and function autonomously, with each such device providing functionality of first and third software applications or first and second software applications or functionality of all three instances.

FIGS. 7-30 demonstrate a plurality of screenshots provided by the application 50 and spread across the three instances of the software application 50. FIGS. 7-20 represent some of the screenshots displayed for the publisher at the second application instance 14. It is preferred that the screens available to the second and third software applications 14 and 16 are also viewable at the first software application 12.

Figure 7:
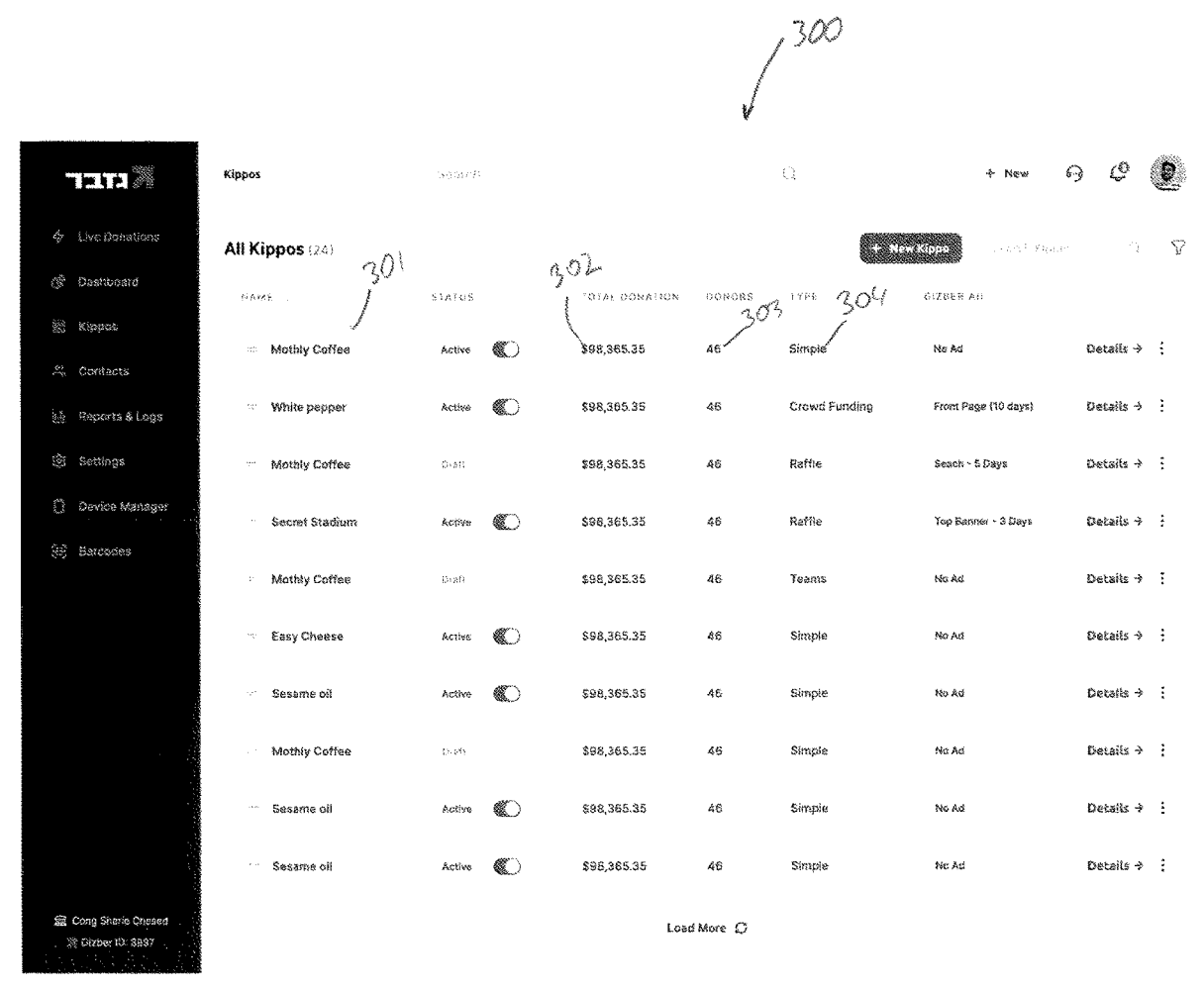

FIG. 7 demonstrates an aggregate screen of all collections 301. Notably collection item 301 is represented at the database level as an object 74. Shown are totals collected 302. The number contributors 303, and incentive methods of collection used 304. Incentives may be a simple one-time contributions process, or a contribution driven by incentives, such as crowd funding, raffles and fund matching.

FIGS. 8 and 9 demonstrates available actions that a human administrator operating the second software application 14 or the manager 10 may take, such as creation or deletion of collections, creation of new users or new identifiers, reassignment of identifiers, etc.

Figure 10:
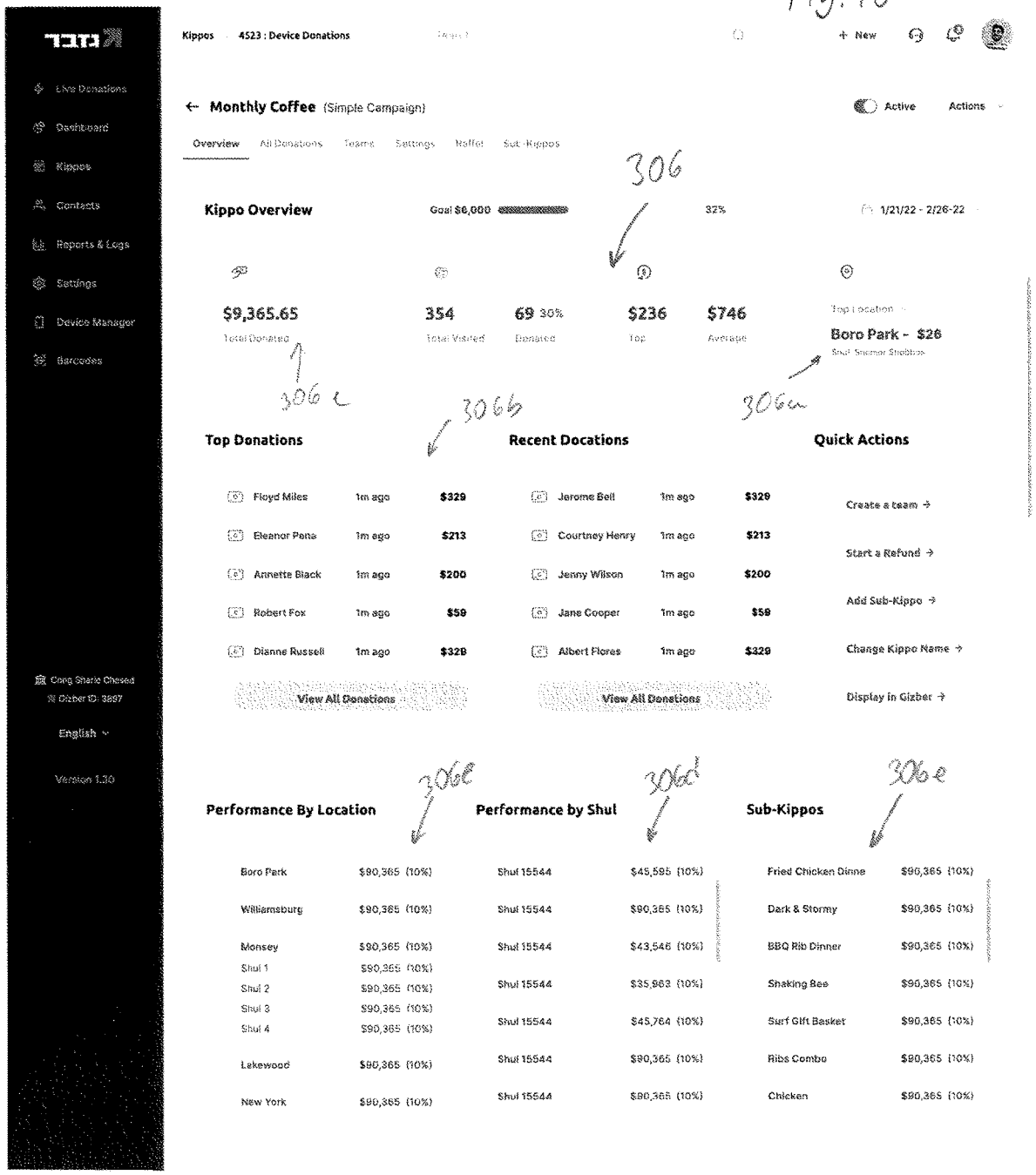
Figure 11:
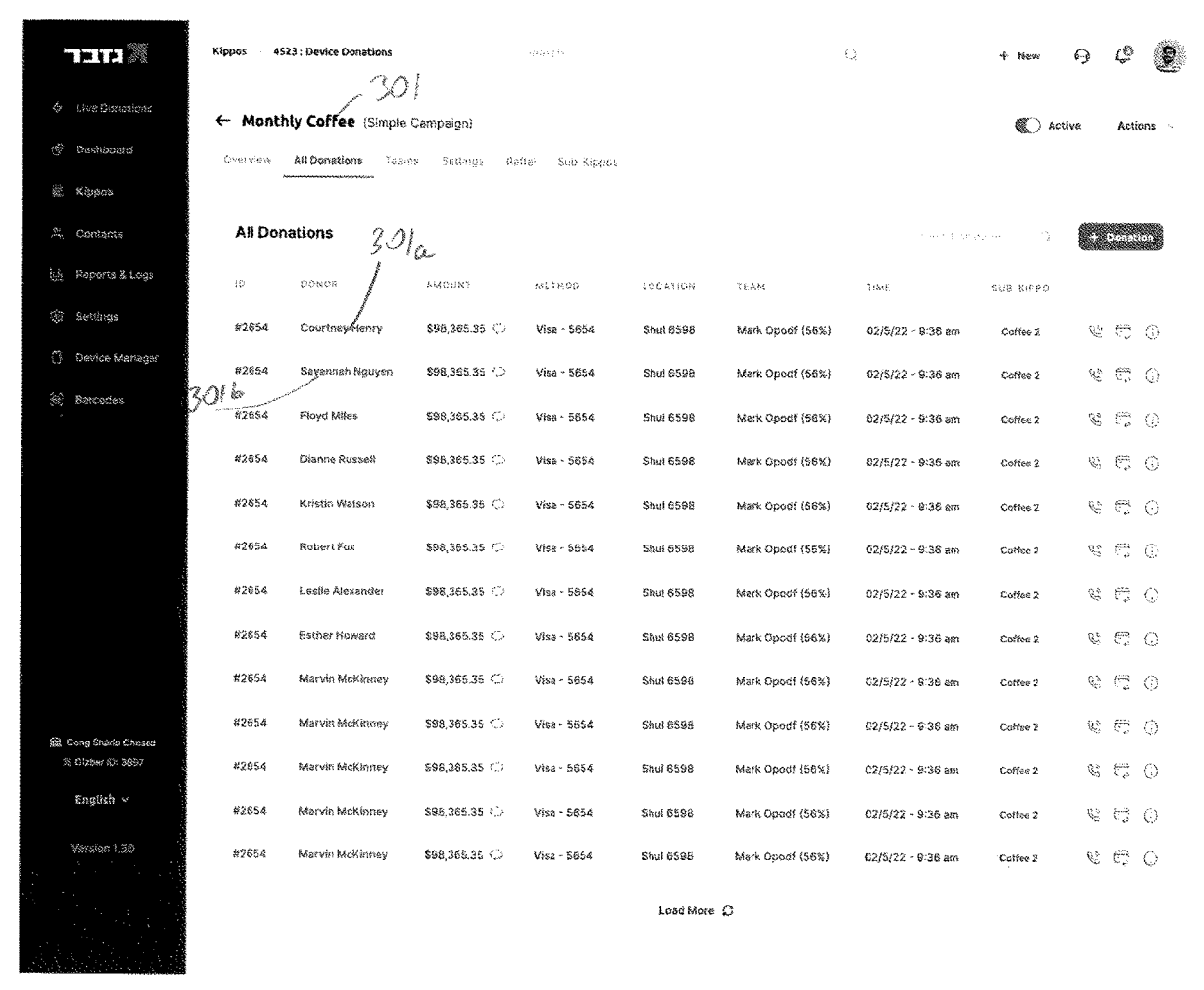
Figure 14:
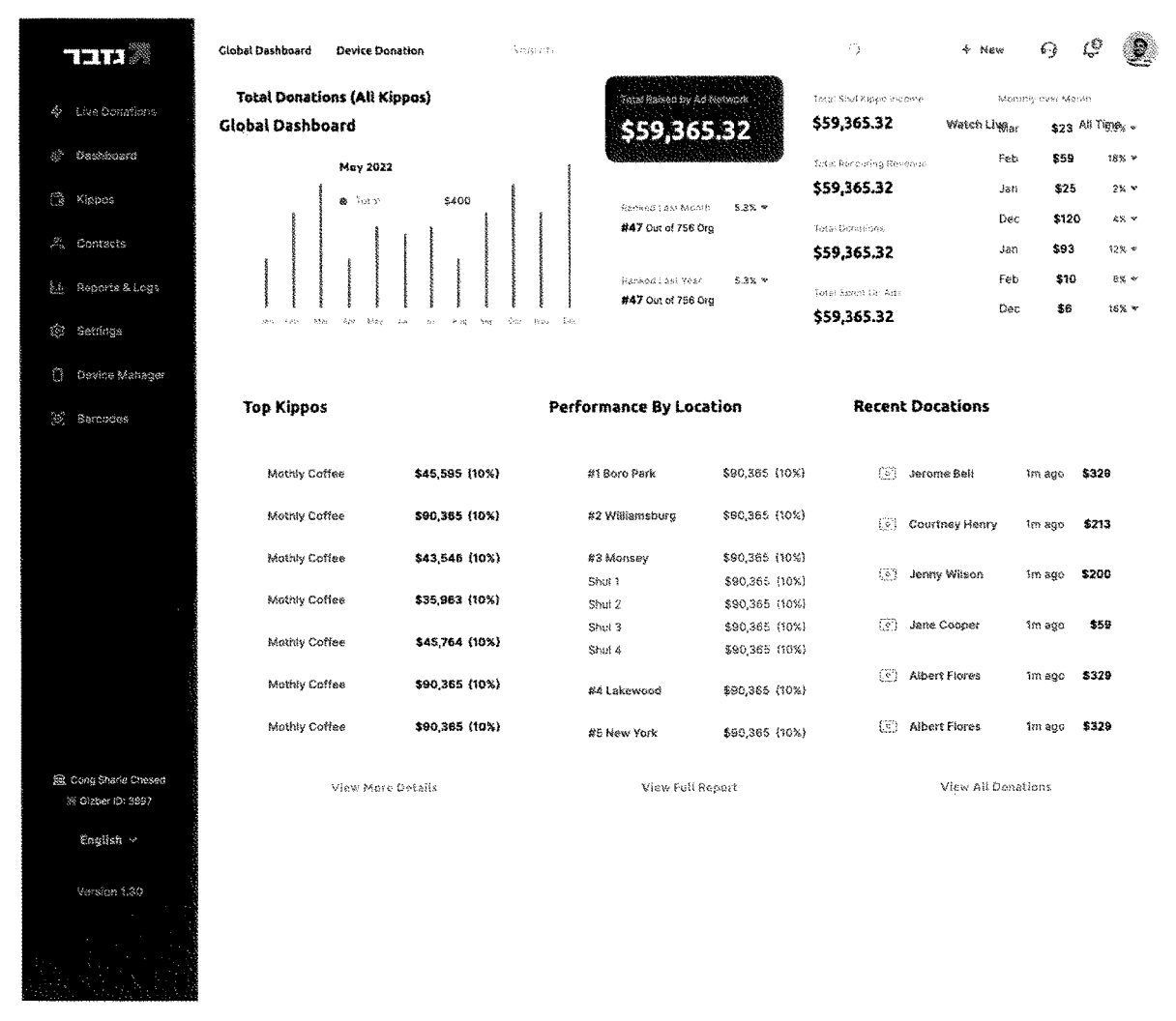

FIGS. 10 and 11 demonstrate reporting features. FIGS. 10 and 14 demonstrate a report for a single collection 306. Shown is the total collected 306c, the top performing region 306a, the top donors 306b. The feature showing top donors may require user accounts 40e (FIG. 5), or the payor information may be collected during the payment phase and communicated to the database 20 during the transfer step 40f. also shown are performance by region 306e or specific communal center 306d. A listing of performance by sub objects is presented as 306e. One familiar with such report screens will appreciate that the report may contain additional or different information as desired by a viewer of such report, with the software application 50 providing a wide-ranging flexibility on manipulating a reporting screen to obtain all desired information. For example, in FIG. 14, a user is able to view performance of all collections. Alternatively, FIG. 14 may be a view exclusive to manager 10, who is able to view and adjust performance for all objects. In another example, in FIG. 11 only a single collection 301 is used, notably a collection created by host 60 most likely through the use of a local object 70i, with various donors 301a and 301b listed by payment method, amount donated, date of donation, etc.

Figure 12:
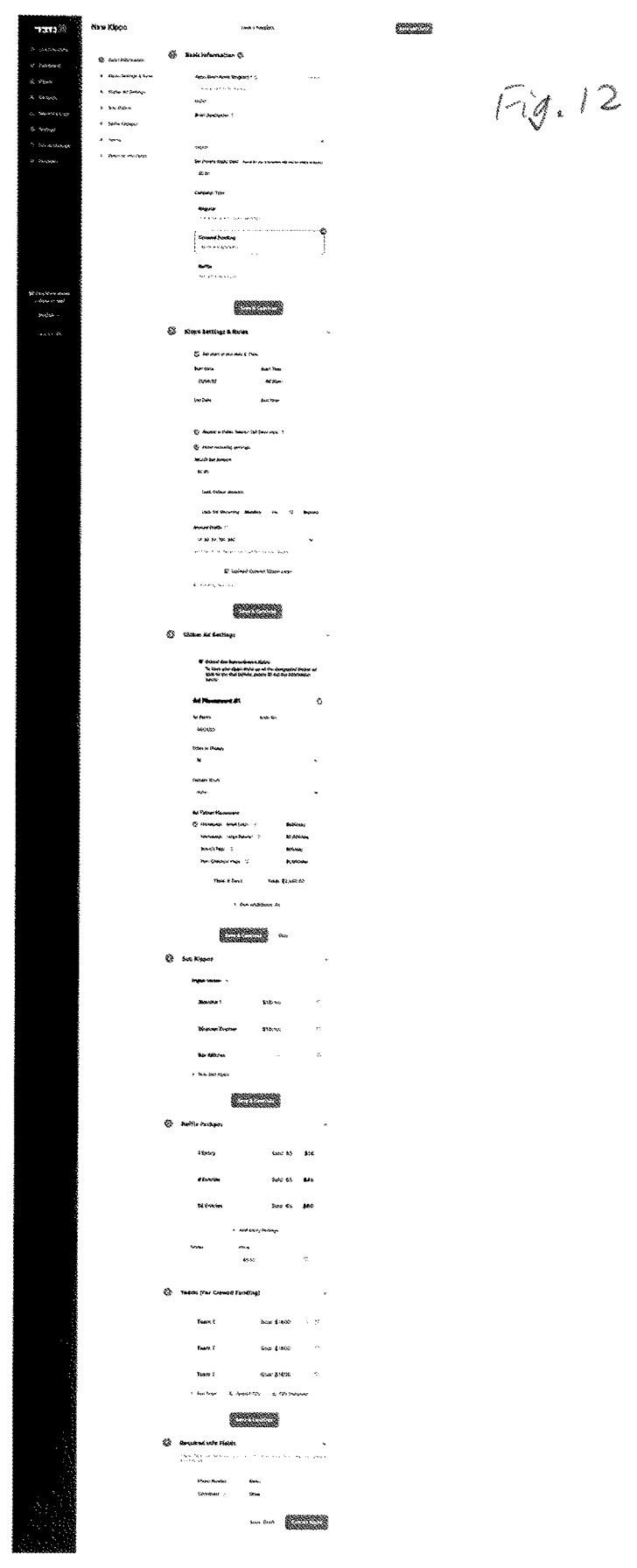
Figure 13:
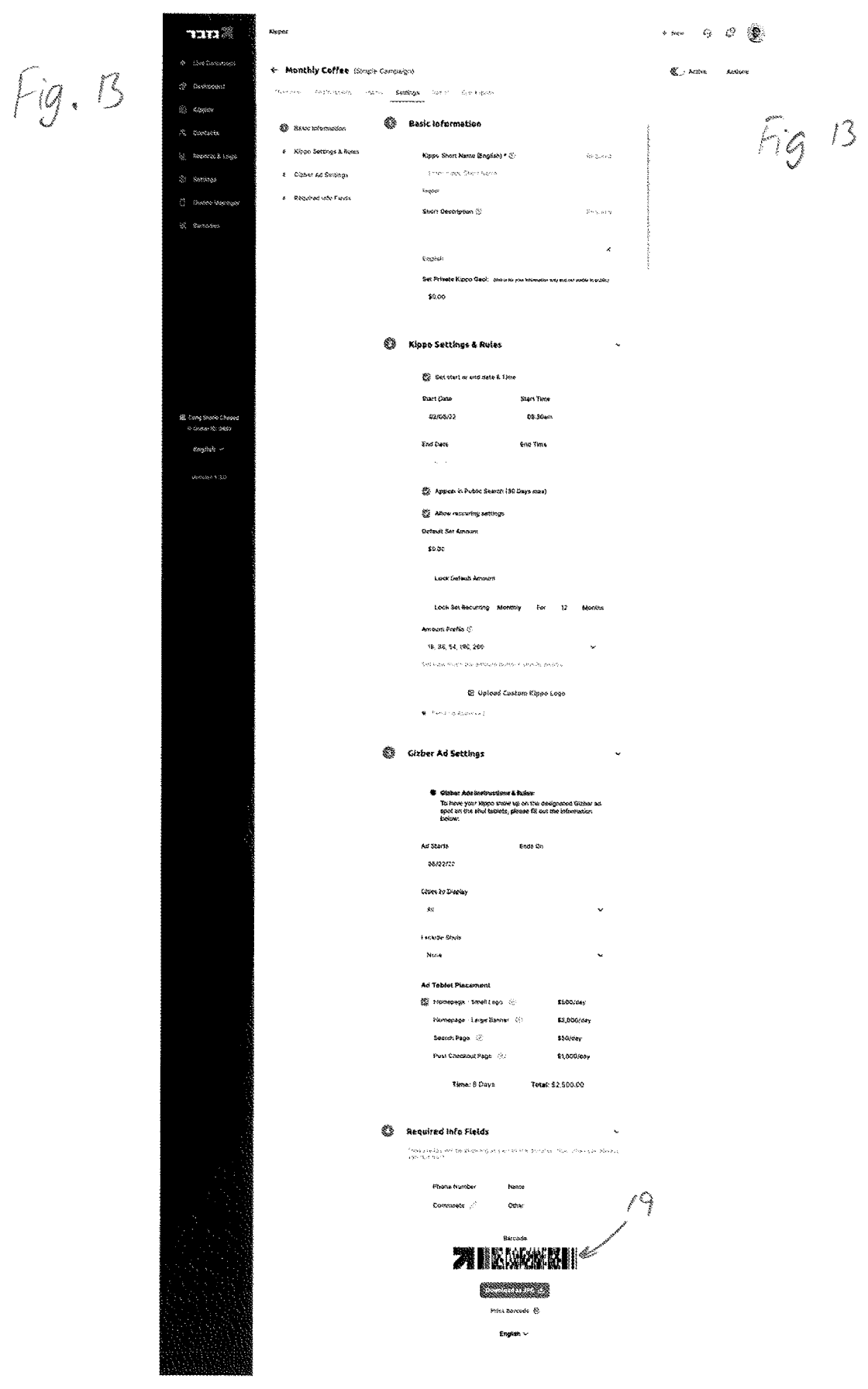
Figure 15:
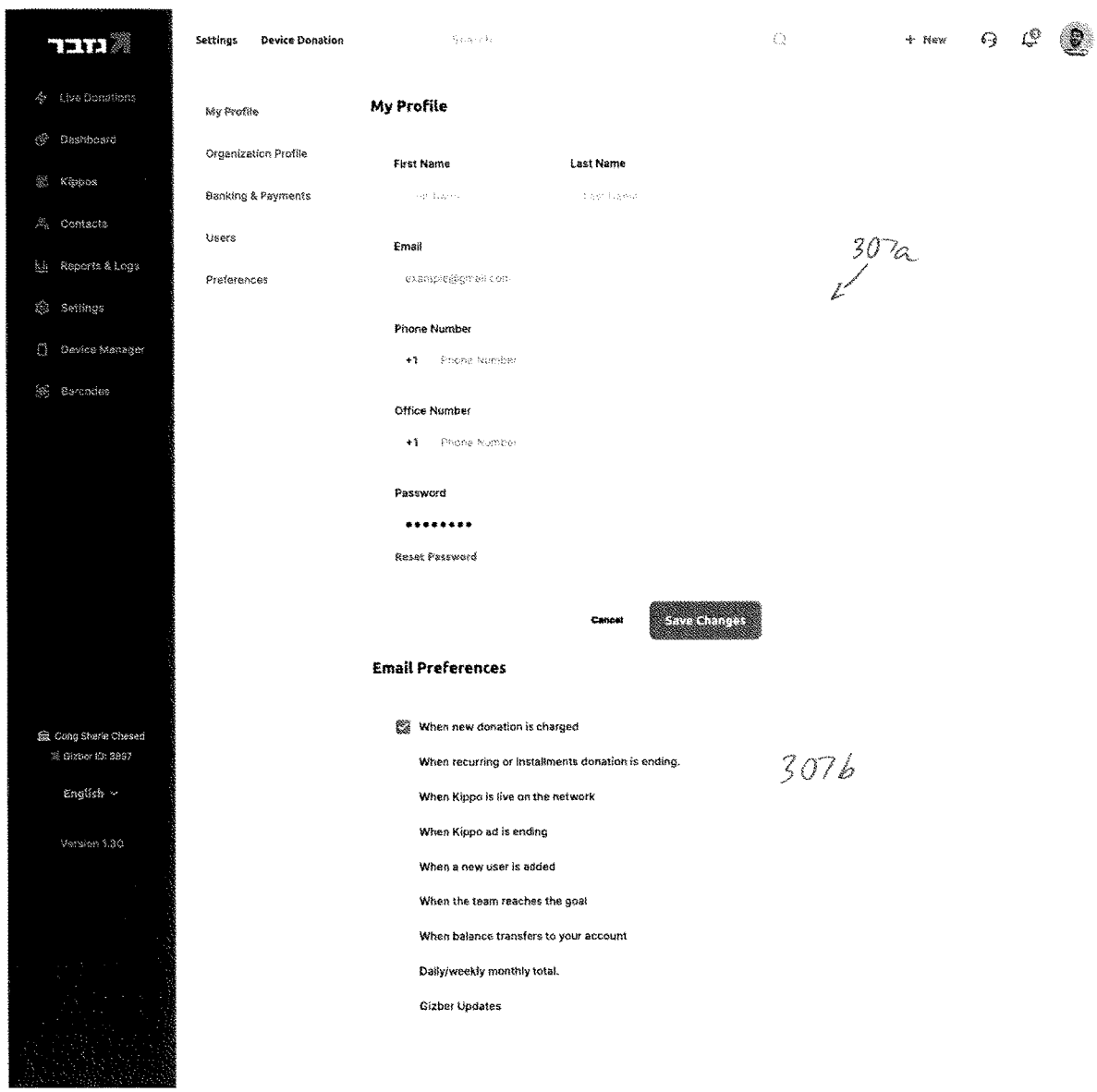
Figure 16:
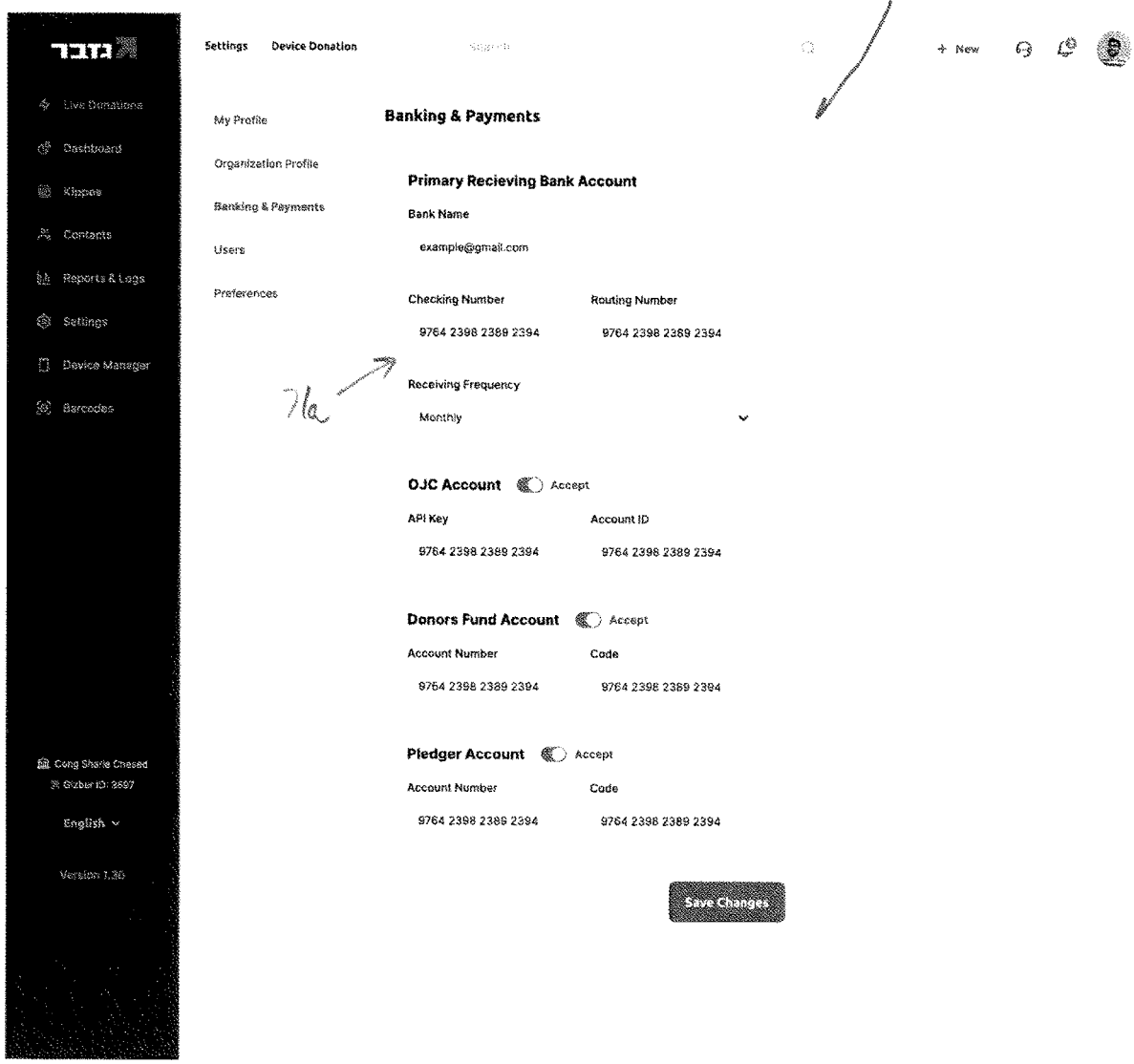

FIGS. 12 and 13 demonstrate the screens and menus for creation of an object and assignment of an identifier 19. A more detailed sub-menu is shown in FIG. 15 with profile setting 307a for each object 74 of a publisher 30, and communication preferences 307b. FIG. 16, shows the configuration of secondary objects 71 containing bank accounts 71a and other information of publishers 30 or users of the kiosk 80, or users of the host 60, that is not intended for public view at a kiosk 80.

Figure 18:

Each publisher 30 may then disseminate identifiers 19 to target users. Using identifier links 19a, a publisher may distribute these by email to prospective users, who may then access a particular object by presenting a screen of their smartphone having an open email with the display of the identifier 19a for identification. FIG. 18 can be used to disseminate each identifier as a card. For example, a collector may cut these apart into separate cards, and hand these out to various individuals, who can then use these to identify the object at a kiosk hosted by their communal center.

Figure 19:
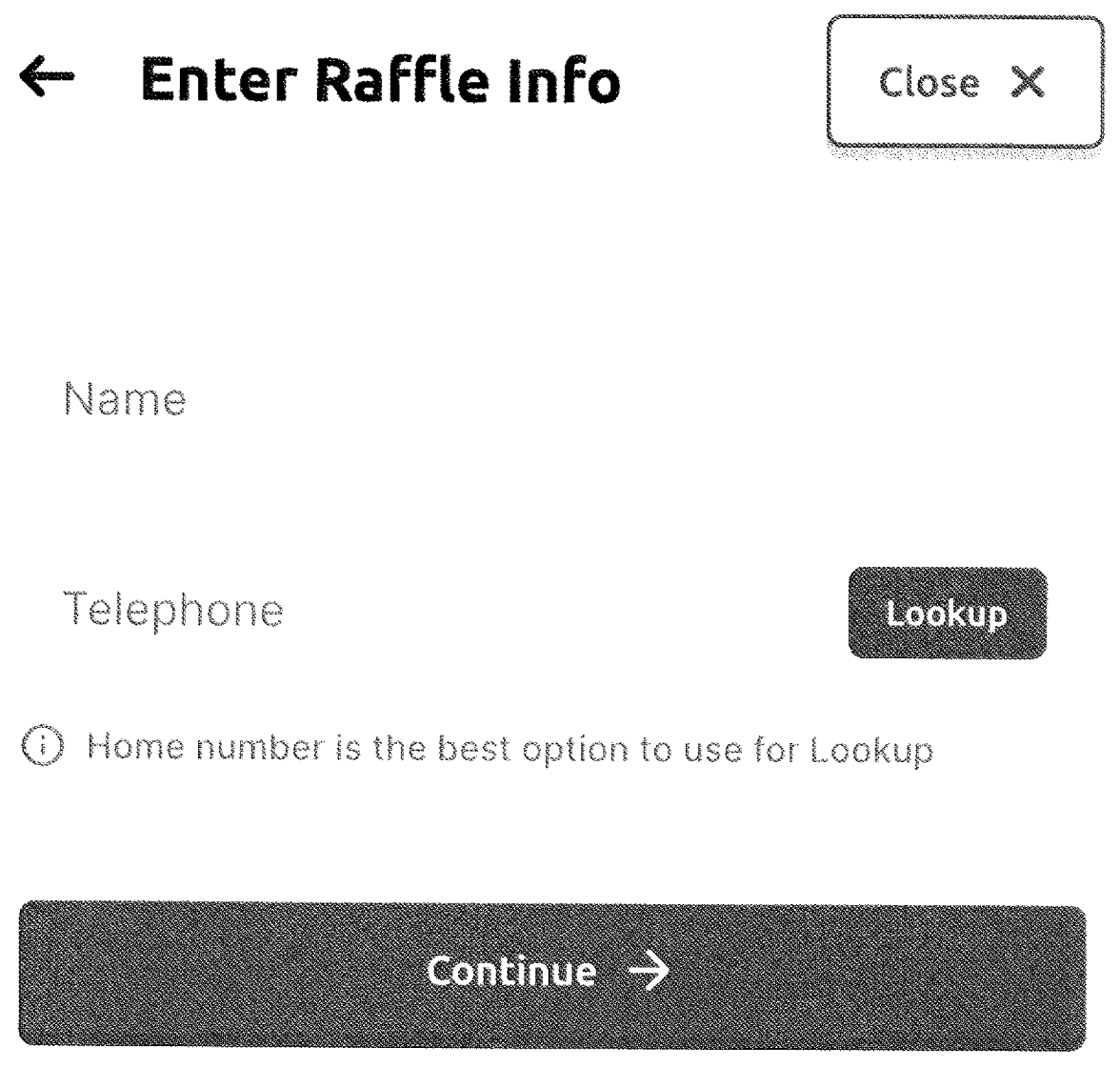

FIG. 19 demonstrates one of the collection incentives, such as the raffle screen 308. Notably, the raffle screen 308 may be set up at the publishing stage, or created at a kiosk 80, for example by a collector eager to motivate more donors to contribute.

Figure 20:
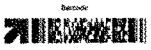
Figure 21:
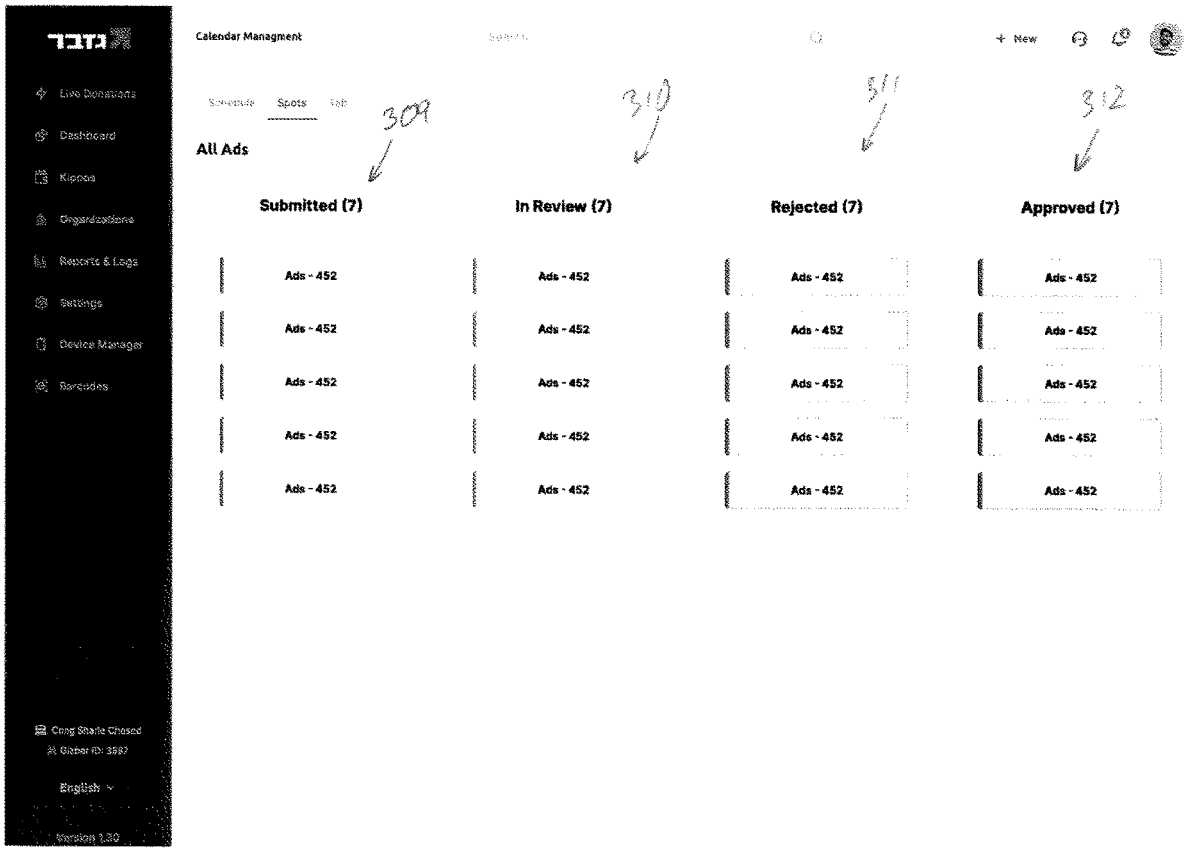
Figure 22:
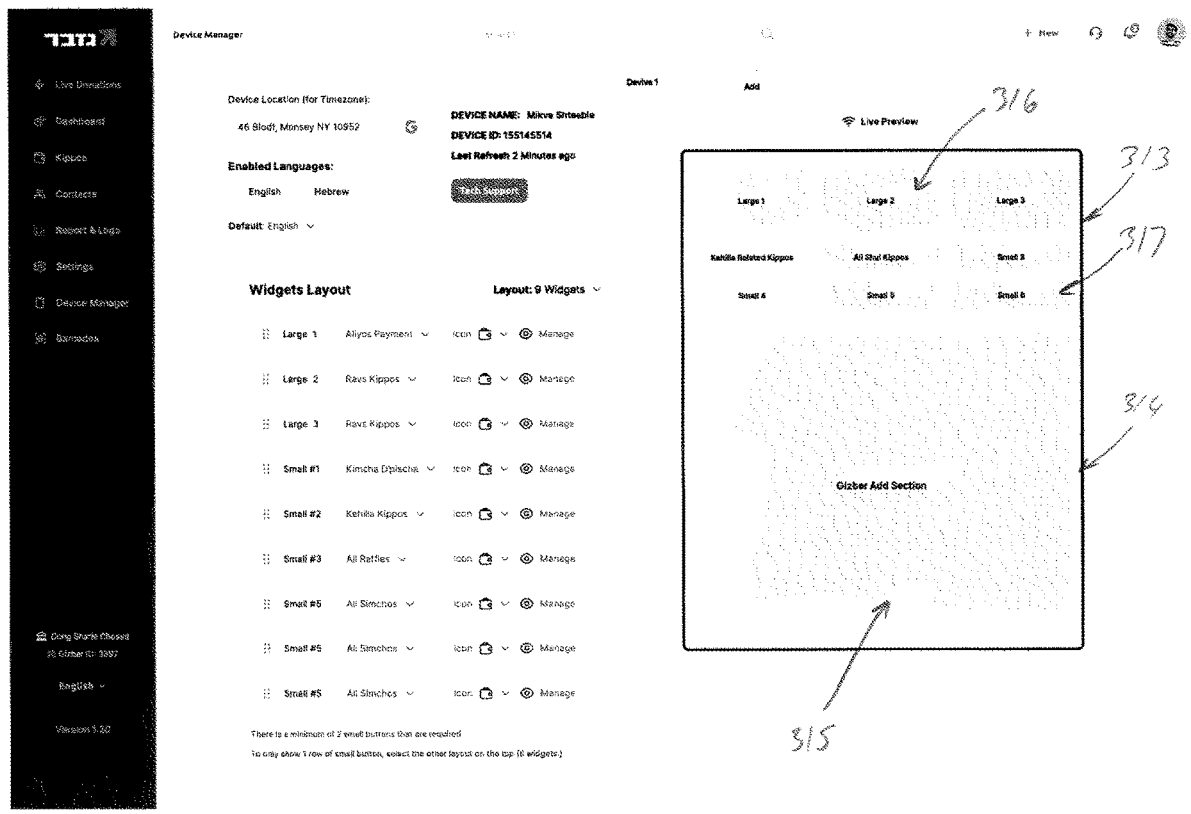

FIGS. 20-22 demonstrate some of the screens exclusive to the manager 10. FIG. 20 is a review screen of an object received by a first software application 12 from a publisher 30, complete with the identifier 19. The identifier 19 may be used by the manager to access each object directly. The identifier 19 may also be stripped out and stored separately. The manager 10 will then group each object as shown in FIG. 21, into submitted objects 309, objects under review 310, rejected objects 311 and approved for distribution 312. Presumably, a notice will be sent to a publisher 30 when an object has changed phases. Alternatively, if many objects are present, the notice will be limited to major events, such as rejection and approval.

FIG. 22 demonstrates how a manager 10 is able to manipulate a screen appearance at a particular kiosk 80 or a set of kiosks 80 in one or several locations, or within a region of kiosks 80. Shown is a host portion of the screen 313 and an object portion 314. The host portion 313 will contain collections and announcements derived from local objects 74i. The object portion 314 will display objects of various other publishers, listed in an order or prominence as determined by the manager or by several bidding processes preferably supported by the application as previously described. Section 317 offers space for additional or common objects or menu items that may work with either the host objects 316, or objects 315 from other publishers.

Figure 23:
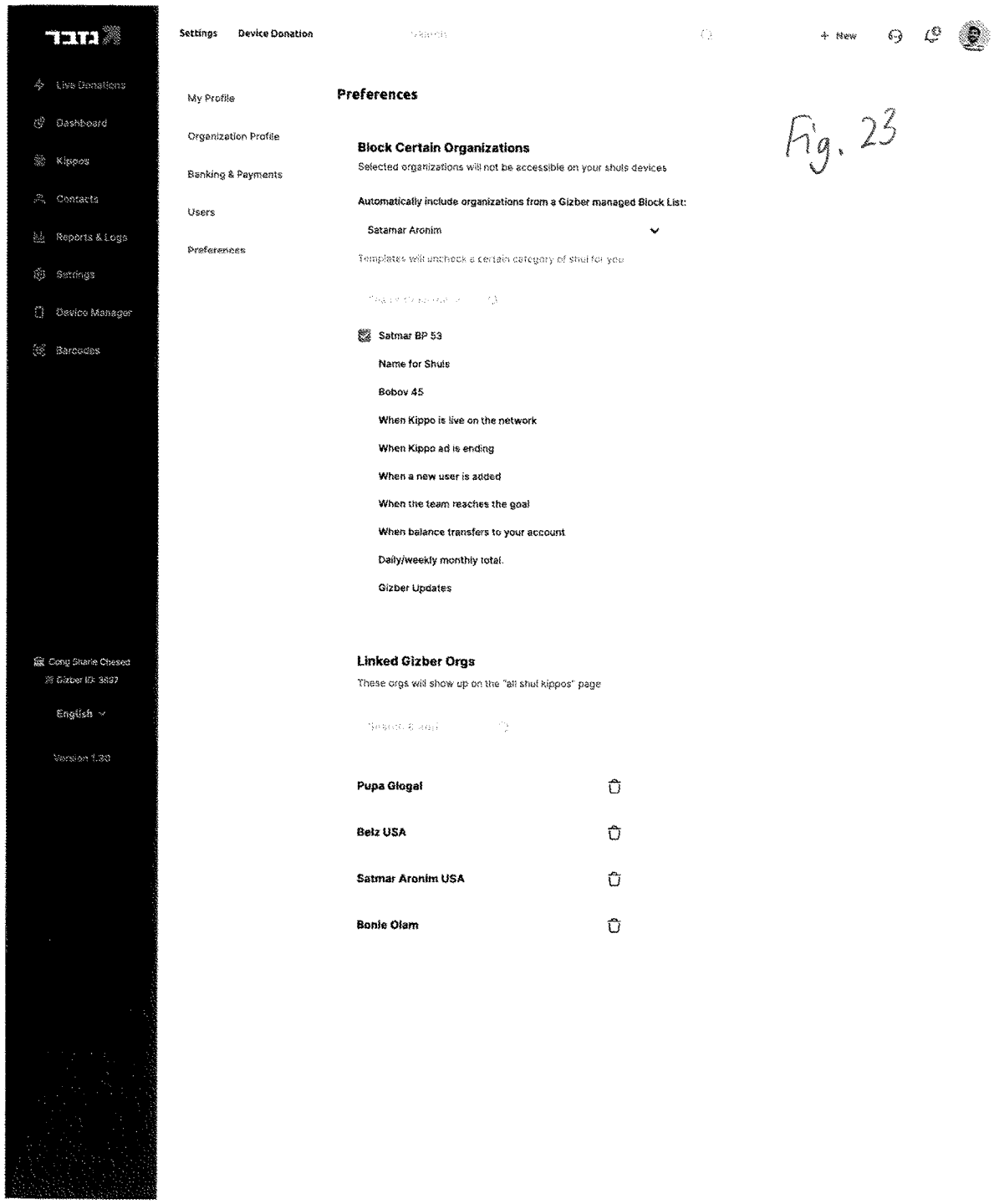

FIG. 23 demonstrates how a manager may manipulate whether an object is presented to certain users, communal centers or regions, or combined into lists of like objects. A manager may also dictate wither a social or religious affiliation, demographic, age group, economic status or a plurality of other factors may influence whether an object may be uploaded to a kiosk 80 or not.

FIGS. 24-30 demonstrate some of the screens shown to users at the computer terminal 80. FIG. 24 is a login/registration screen. Note that registration by a user is preferably performed by the third software application 3 and then kept local to the particular kiosk 80 or distributed to other computer terminals 80 via the link between the third and first software applications 16 and 12, respectively. FIG. 25 may be a screen available to a user, publisher or manager and permits attributes to be added to each user, publisher 30 or object 74. Modification may take place at the kiosk level 30 or at the publisher level 30.

Figure 26:
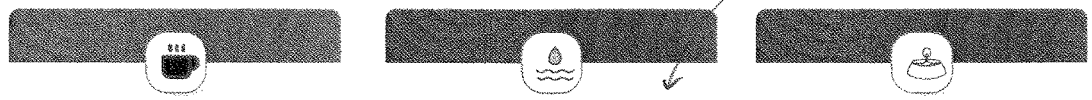

FIGS. 26 and 27 demonstrate the initial screen. An initial screen may be configured in the process described in FIG. 22. Section 313 contains hosts objects 316. Section 314 presents collections uploaded as objects to the kiosk 80 and shown based on bidding or importance. The collection objects 315a may appear on top due to popularity, a top bid or particular importance to the community or region where this computer terminal 80 is located. A plurality of other objects may be searched for alphabetically or by scrolling through the screens.

Figure 28:

FIG. 28 demonstrates a search screen shown to a user. Note that a user, may select the find feature 319, and then search for an object using a bark code. Once the object is located, as shown in FIG. 29 a user may determine how much to contribute, at what intervals, denominations, and as shown in FIG. 30 at what duration. Other preferences may be included as well.

Figure 31:
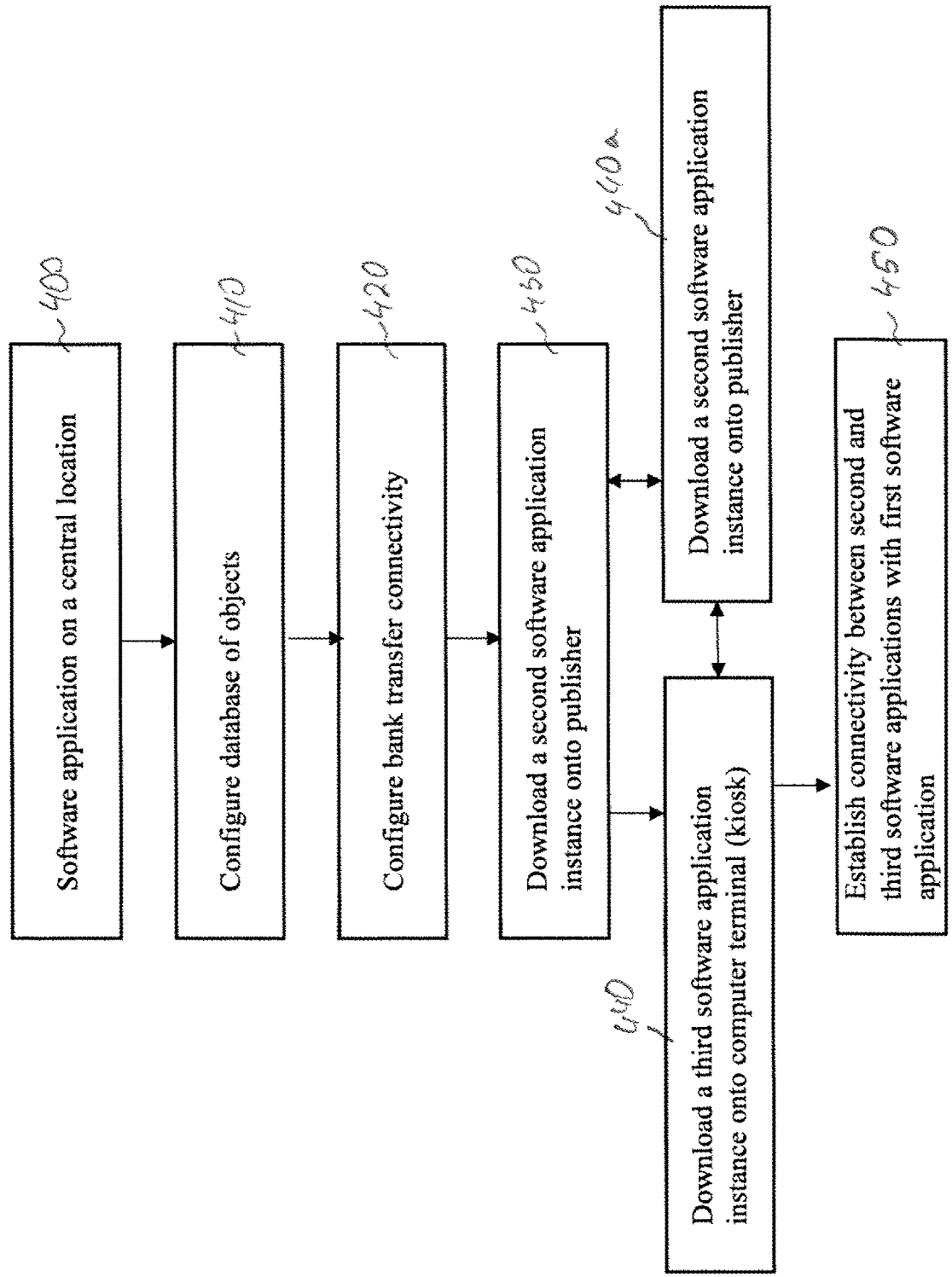
FIGS. 31-35 diagrams the steps of the method enabled by the disclosed system.

FIG. 31 demonstrates the initial steps of the method disclosed by the computer system. The method begins with having a software application 50, having modules for the first software application 12, the second software application 14 and the third software application 16. The software application 50 requires a database connection. The disclosed application may configure a property database to store objects 74 and secondary objects 71. It may also utilize commercially available solutions, such as MySql, MicrosoftSQL, MongoDB, Oracle, Sybase or Quickbase, or many others. The software application 50 will need to establish a bank fund transfer configuration, such as set up network connectivity and establish appropriate level of security. The publishers 30 then install a locally executing second software application 430. Host locations 60 deploy at least the third software application in step 440 to display items on a local kiosk 80. A host 60 may additionally also deploy publishing second software instance in step 440a, with this publishing instance communicating directly with the third software application deployed in step 440 and with software application in step 400. The connectivity for sharing objects and information regarding these objects is then established between the first, second and third software applications in step 450.

Figure 32:
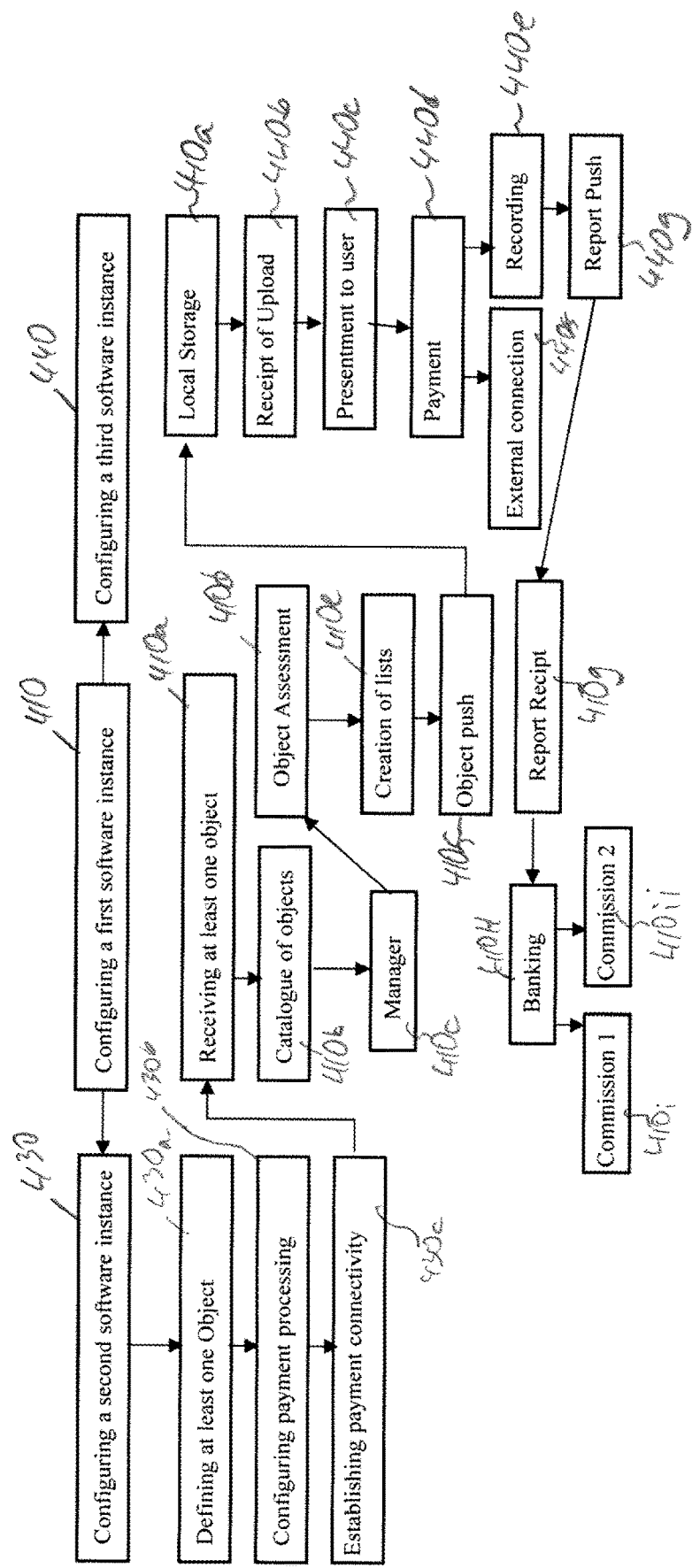

FIG. 32 is a more detailed representation of the disclosed method. The step of configuring the second software instance 430 on the publisher 30 includes additional steps of defining at least one object 430a, configurating payment processing 430b for each object created in step 430a and establishing a payment connectivity 430c to process payments being received for or on behalf of the publisher 30.

The step of configuring a third software instance 440 preferably includes additional steps of configuring or ensuring the presence of sufficient local storage 440a. The storage step 440a is usually performed simultaneously with step 450 of ensuring connectivity. The storage step 440a is preferably followed by the step of receiving a periodic upload of objects 440b from the first software application 12, followed by the step of presentment of a plurality of objects to a user 440c. Upon presentment in step 440c, a user may submit a payment in response to a message or a call to action seen on the object during presentment 440c. The payment step 440d preferably further comprises the steps of establishing a connection to a third-party collection facility in step 440f and the recording of the payment or response to call to action in step 440e. The step of recording 440e is preferably further comprising the step of transfer of reports 440g to the first software application 12. Upon receipt of the transfer in step 440g, the method is preferably further comprising the step of recording the receipt and generating reports 410g. Whether a reporting step 410g is carried out, the preferably next step after the receipt step on 410g is the banking step 410h which is further comprised of steps of collection commissions for the manger 10 in step 410i and/or collecting commissions for hosts in step 410ii where a payment in step 440d was made.

Figure 33:
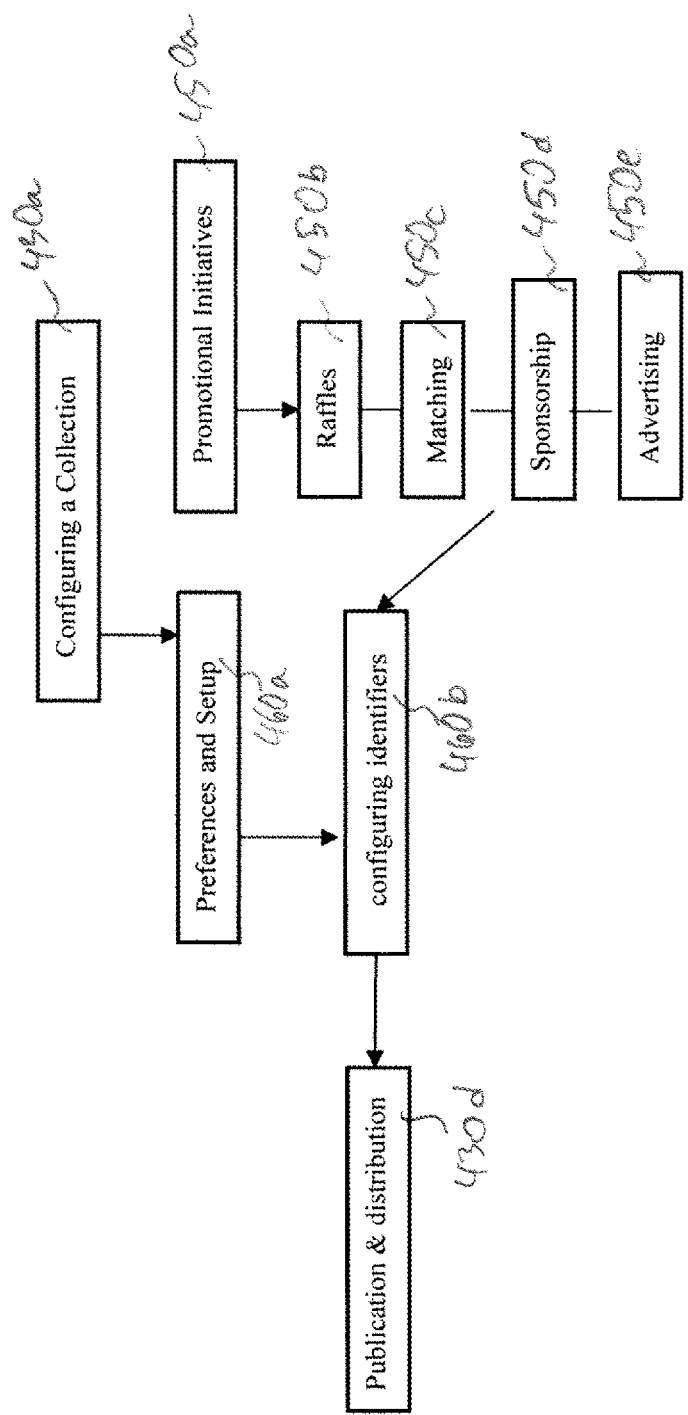

The step of creating at least one object 430a, shown in FIG. 33, is preferably further comprising the steps of establishing object preferences in step 460a and establishing promotional techniques for the object in step 450a. The step of establishing promotional techniques 450a preferably further comprises one or more of the following steps: a) configuring a raffle or sweepstakes scheme in step 450b, b) creating a fund matching scheme 450c; c) establishing a sponsorship or endorsements in step 450d and c) advertising and promoting in step 450e of the object created in step 430a. It should be noted that the step of establishing preferences 460a and any or all of the sub-steps of promotional techniques 450a (450b, 450c, 450d, and 450e) may be assigned a separate unique identifier 460b. Notably the identifier created in step 460b may be separately disseminated from the object it represents, so that applications down the processing line, namely, the first software application 12 and the third software application 16, as well as a user of a kiosk, are given an option of identifying a particular object, or promotional aspect of the object, or a sub-list of an object by presenting an identifier at the presentment step 440*d*. The aforementioned steps of creating and configuring an object (collection) in step 430*a* is preferably followed by the step of publishing the new object in step 430*d* to a first software application 12 or to a host's own kiosk.

Figure 34:
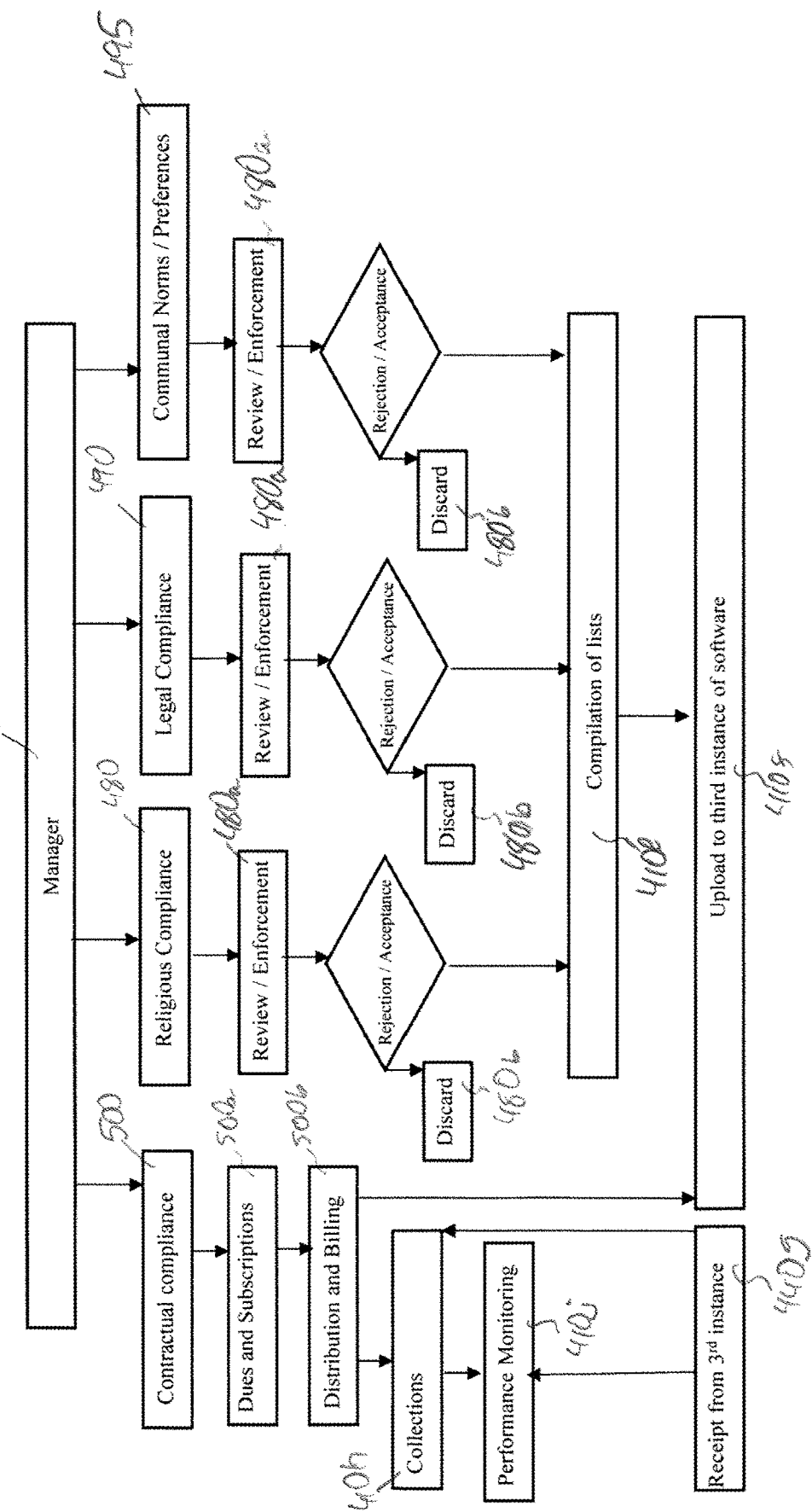

FIG. 34 demonstrates further steps pertaining to the assessment of objects step 410*d* by a manager 10. The assessment step 410 preferably further comprises the step of evaluating contractual compliance 500 of the publisher 30 as well as acceptability of the object based on religious compliance 480, legal compliance 490 or ethics, preferences and accepted norms compliance 495. Notably additional, fewer or difference factors may be important during the object assessment step 410*d*.

The steps of religious, legal or ethical compliance evaluation 480, 490 and 495, respectively, lead to the step of review and enforcement step 480*a*, which may result in a rejection of the of the object in step 480*b* or upload of the object to a kiosk(s) 80 in step 410*f*. Prior to the upload of the object, there may be an additional step of bundling a plurality of compatible objects into lists in the step 410*e*. Notably, the compatibility of objects is determined by the preference of manager 10, the publisher 30, as well as anticipated or known norms and preferences of the targeted users.

The contract compliance step 500 preferably further comprises the steps of evaluating the currency and sufficiency of dues and subscriptions of a particular publisher 30 and of the a targeted host 60 and the steps of correcting insufficiencies or irregularities in billing and subscriptions in step 500*b*. If the contractual compliance 500 is satisfied the object proceeds to upload 410*f*, provided that other compliance steps, namely 480, 490 and 495 are satisfied.

The step of receiving a transfer of report or response 440*g* from the third software application 16, preferably results in collections steps 410*h*, where the first software application charges a commission against the banking information of the publisher 30 whose object 74 triggered a payment by a user during presentment step 440*d*.

Figure 35:
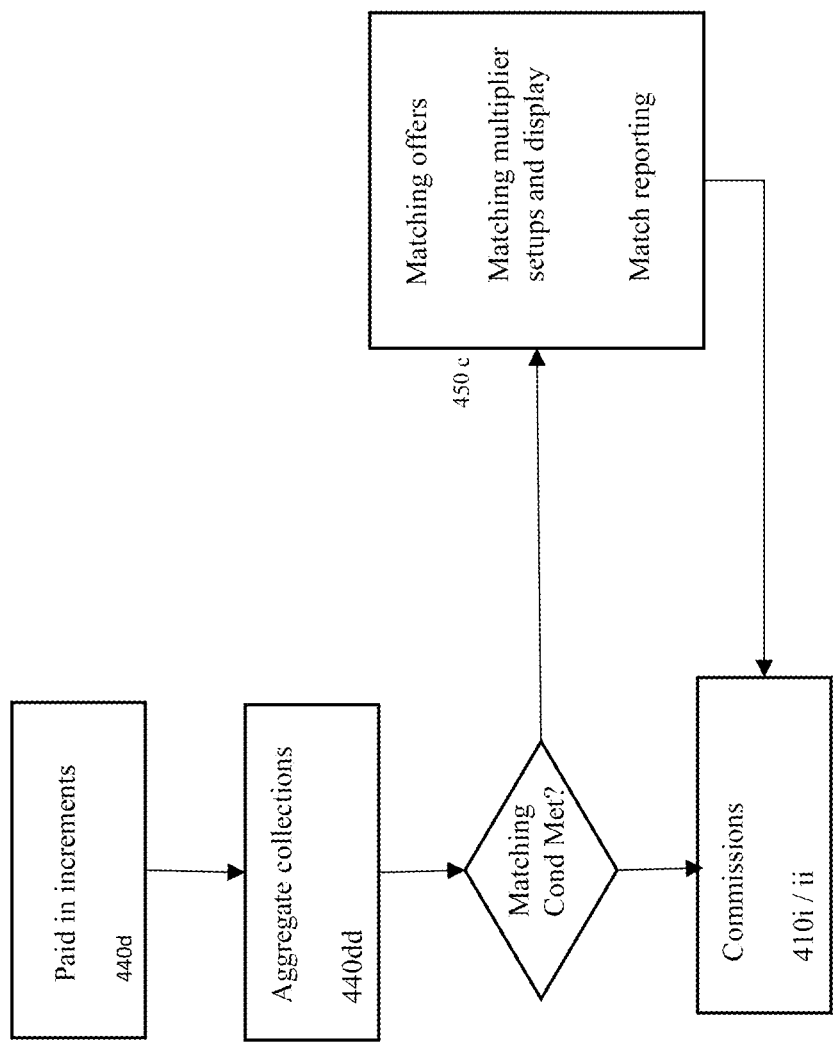

As shown in FIG. 35, the step of creating the fund matching scheme 450*c* works is preferably instrumented together with the step of payment 440*d*. The step of payment 440*d* preferably further comprises steps that include but are not limited to the step of aggregate collections 440*dd*, which would include a) payments to be made for each individual collection/object, b) payments made for all objects pertinent to the user's session (which may include but are not limited to collections represented by user's scanned bar code, user's searched collections, advertised collections or trending collections); c) made to objects in such amounts and to such collections as a user sets during the payment session 440*d*; or d) payments made in installments to such object or objects as a user may determine. All or some of such payments, as matching conditions may specify, may be added together to determine with a matching condition has been met. The matching step 450*c* may further be made of steps of creating matching overs at the first software instance or at the kiosk 80, advertising and showing existing matching offers and reporting of matching actions or campaigns already taken place. The matching step 450*c* leads to final calculation of commissions 410*i/ii* which may or may not take matching campaigns into account.

Although this invention has been described with a certain degree of particularity, it is to be understood that the present disclosure has been made only by way of illustration and that numerous changes in the details of construction and arrangement of parts may be resorted to without departing from the spirit and the scope of the invention. While various inventive aspects, concepts and features of the inventions may be described and illustrated herein as embodied in combination in the exemplary embodiments, these various aspects, concepts and features may be used in many alternative embodiments, either individually or in various combinations and sub-combinations thereof. Unless expressly excluded herein all such combinations and sub-combinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein. Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure, however, such values and ranges are not to be construed in a limiting sense and are intended to be critical values or ranges only if so expressly stated. Parameters identified as "approximate" or "about" a specified value are intended to include both the specified value and values within 10% of the specified value, unless expressly stated otherwise. Further, it is to be understood that the drawings accompanying the present disclosure may, but need not, be to scale, and therefore may be understood as teaching various ratios and proportions evident in the drawings. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention, the inventions instead being set forth in the appended claims, as currently written or as amended or added in the future. Descriptions of exemplary methods or processes are not limited to inclusion of all steps as being required in all cases, nor is the order that the steps are presented to be construed as required or necessary unless expressly so stated.

What is claimed:

1. A system comprising an electronic device instrumented to display or collect pledges or tuition payments or donations or communal service functions or announcements; wherein said electronic device instrumented to permit a user to display or pay said pledges or said tuition payments or said donations or said communal service functions for at least one payee from a list of payees; said electronic device is configured to be used by any member of the general public; wherein a provider of said electronic device receives a fee from at least one payee or wherein said provider of said electronic device receives a portion of an amount collected frog said member of general public.

2. The system of claim 1, wherein said electronic device further comprising a software application, said software application configured to facilitate said collection, said pledge, said tuition payment, said donations, or participation in said communal service function on behalf of a user.

3. The system of claim 2, wherein said software application is instrumented to suggest or direct a user to said collection, said pledge, said tuition payment, said donation or said communal service function based on a user's activity or searching for said collection, said pledge, said tuition payment, said donation or said communal service function; and wherein said software application is further instrumented to suggest search results to said user based on similarity of a searched data to a suggested data; and wherein said software application displaying to said user actual search results or suggested search result.

4. The system of claim 3, wherein said software application configured to enable a user to set payment terms for said collection, said pledge, said tuition payment, said donation or said communal service function; wherein said payment terms permitting a payment for all or a payment in specific amount or a payment term and interval; wherein said collection, said pledge, said tuition payment, said donation or said communal service function may be for one payee or many payees.

5. The system of claim 2, wherein said software application configured to enable a user to set payment terms for said collection, said pledge, said tuition payment, said donation or said communal service function; wherein said payment terms permitting a payment for all or a payment in specific amount or a payment term and interval; wherein said collection, said pledge, said tuition payment, said donation or said communal service function may be for one payee or many payees.

6. The system of claim 2; wherein said software is configured to display a single or multiple payment causes for a payee.

7. The system of claim 2, wherein said software application is configured to enable a payee to choose from one or more acceptable payment options; wherein said acceptable payment options are comprised of a single payment, or a partial payment, or an incremental payment, or a payment schedule, or a reoccurring payment.

8. The system of claim 2, wherein said software application further communicates with a first software application or a second software application or a third software application; wherein said first or said second or said third application is one electronic device or another electronic device.

9. The system of claim 2, wherein said software application further comprising a database; said database managed by said software application; wherein said software application configured to dynamically store within said database a plurality of objects; wherein each of said plurality of objects having at least one list; wherein any of said at least one list, comprising a tracking identifier for said at least one list or said at least one object of said plurality of objects; and wherein said at least one list representing an information or a payee information for said collection, said pledge, said tuition payment, said donations, or participation in said communal service function; and wherein an instance of said software application configured to connect to a payment utility identified by said at least object of said plurality of objects; wherein said payment utility is utilized to collect payment from said user.

10. The system of claim 2, where a commission or fee is collected from a payee based on amount of payment received on said electronic device; and wherein at least a portion of said fee or said commission is paid to a host of said electronic device.

11. The system of claim 2, wherein said software application is configured to accept user input through a barcode reader or a biometric reader, and at least one of the following: a proximity reader; a card input reader; a magnetic strip reader; a security chip reader; a biometric reader, a barcode reader.

12. The system of claim 2, wherein said software application is instrumented to contain or track user accounts.

13. The system of claim 1, wherein said software application configured to enable a user to set payment terms for said collection, said pledge, said tuition payment, said donation or said communal service function; wherein said payment terms permitting a payment for all or a payment in specific amount or a payment term and interval; wherein said collection, said pledge, said tuition payment, said donation or said communal service function may be for one payee or many payees.

14. The system of claim 1, wherein said electronic device further comprising a scanner or a printer interface.

15. The system of claim 1, where a commission or fee is collected from a payee based on amount of payment received on said electronic device; and wherein at least a portion of said fee or said commission is paid to a host of said electronic device.

16. The system of claim 15, further comprising a software application; wherein said software application is instrumented to authenticate or process a secure instrument introduced by a user through said scanner or said printer interface; and wherein said software process is configured to void said secure instrument upon successful authentication or processing of said secure instrument.

17. The system of claim 1, wherein said electronic device is further comprised of or connected to a barcode reader or a biometric reader, and at least one of the following: a proximity reader, a card input reader, a magnetic strip reader, a security chip reader, a biometric reader, a barcode reader.

18. An electronic device located in a public place instrumented for collecting payments for one or multiple payees; wherein said one or said multiple payees are selected by a payor using said electronic device; said electronic device comprising a bar code reader; said bar code reader triggers a display of a cause, or a payment option, or a display that can lead to a payment; wherein a bar code being scanned by said bar code reader identifies said payee or said cause; and said electronic device is configured to be used by any member of the general public; wherein a provider of said electronic device receives a fee from at least one payee or wherein said provider of said electronic device receives a portion of an amount collected from said member of general public.

* * * * *